(12) United States Patent
Wilkins, Jr. et al.

(10) Patent No.: US 7,010,398 B2
(45) Date of Patent: Mar. 7, 2006

(54) CONTROL SYSTEM PROVIDING PERSPECTIVE FLIGHT GUIDANCE

(75) Inventors: Robert Ryan Wilkins, Jr., Greenville, DE (US); Kenneth Scott Harris, Wilmington, DE (US)

(73) Assignee: The Boeing Company, Chicago, IL (US)

( * ) Notice: Subject to any disclaimer, the term of this patent is extended or adjusted under 35 U.S.C. 154(b) by 208 days.

(21) Appl. No.: 10/376,869

(22) Filed: Feb. 27, 2003

(65) Prior Publication Data

US 2003/0222887 A1 Dec. 4, 2003

Related U.S. Application Data

(63) Continuation-in-part of application No. 09/975,624, filed on Oct. 11, 2001, now Pat. No. 6,798,423.

(51) Int. Cl.
*B64C 13/20* (2006.01)
*G05D 1/00* (2006.01)

(52) U.S. Cl. .................. 701/3; 701/7; 701/8; 701/9; 701/10; 701/14; 701/200; 701/202; 701/210; 701/211; 701/1; 340/945; 244/75 R; 244/76 R

(58) Field of Classification Search ................ 244/1 R, 244/75 R, 76 R; 342/29; 73/178 R; 701/3, 701/7, 8, 9, 10, 14, 200, 202, 210, 211, 1; 340/945
See application file for complete search history.

(56) References Cited

U.S. PATENT DOCUMENTS

| | | | | |
|---|---|---|---|---|
| 5,754,430 A | * | 5/1998 | Sawada | ...................... 701/209 |
| 5,838,262 A | | 11/1998 | Kershner et al. | |
| 6,021,374 A | | 2/2000 | Wood | |
| 6,055,477 A | * | 4/2000 | McBurney et al. | ......... 701/207 |
| 6,320,579 B1 | * | 11/2001 | Snyder et al. | .............. 345/419 |
| 6,496,760 B1 | | 12/2002 | Michaelson et al. | |
| 2002/0040271 A1 | * | 4/2002 | Park et al. | ................... 701/209 |
| 2003/0093187 A1 | * | 5/2003 | Walker | ......................... 701/1 |
| 2003/0132860 A1 | * | 7/2003 | Feyereisen et al. | ......... 340/973 |
| 2003/0222887 A1 | * | 12/2003 | Wilkins et al. | ............. 345/618 |
| 2003/0227395 A1 | * | 12/2003 | Zeineh | ....................... 340/988 |
| 2004/0015274 A1 | * | 1/2004 | Wilkins et al. | ................ 701/3 |

OTHER PUBLICATIONS

Wilkins, Robert R., Jr., "Use of Predictive Perspective Guidance Displays for Increased Situational Awareness" presented at the American Helicopter Society $57^{th}$ Annual Forum, Washington, D.C., May 9–11, 2000.

* cited by examiner

*Primary Examiner*—Olga Hernandez
(74) *Attorney, Agent, or Firm*—Harness Dickey & Pierce P.L.C.

(57) ABSTRACT

A flight guidance system providing perspective flight guidance symbology using positioning and terrain information provides increased pilot situational awareness of the pilot's aircraft. The guidance system uses a positioning system and a detailed mapping system to provide a perspective display for use in an aircraft. A precision pathway flight guidance (PFG) symbology set is thereby displayed on a pilot display. The PFG symbology set includes broken line symbols representing an open tunnel and providing flow field data, a half-bracket symbol to indicate that the aircraft is no longer in the open tunnel represented by the broken line symbols and a quickened flight path vector (QFPV) symbol to provide the pilot with predictive flight path information. A flight director system and tunnel generator component provide for updating the displayed PDFG symbology set based upon current aircraft conditions (e.g., aircraft position) and stored flight path information.

34 Claims, 10 Drawing Sheets

OFF COURSE BRACKET SYMBOL

CONTROL SYSTEM PROVIDING PERSPECTIVE FLIGHT GUIDANCE

CROSS-REFERENCE TO RELATED APPLICATIONS

This application is a continuation-in-part of U.S. patent application Ser. No. 09/975,624 filed Oct. 11, 2001 now U.S. Pat No. 6,798,423, and entitled "PRECISION PERSPECTIVE FLIGHT GUIDANCE SYMBOLOGY SYSTEM", the entire disclosure of which is hereby incorporated herein by reference.

STATEMENT REGARDING FEDERALLY SPONSORED RESEARCH

The invention described herein was made in the performance of work under NRTC-RITA Cooperative Agreement No. NCCW-0076 WBS 00D-RITA-05-10-P2 and the U.S. Government may have certain rights thereto.

FIELD OF THE INVENTION

The present invention relates generally to aircraft guidance systems using perspective flight guidance information.

BACKGROUND OF THE INVENTION

In order to reduce tracking errors and pilot workload, a pilot may be provided with increased situational awareness of an aircraft with respect to a desired flight path. In particular, a pilot must be aware of the actual aircraft performance, or flight path vector (FPV), the desired or commanded aircraft performance, and the predicted aircraft performance. The use of a perspective display with a predictive flight path or performance symbology set provides increased situational awareness. Perspective displays with predictive symbology permit a pilot to "see" what will be required or demanded of the aircraft to maintain a desired flight path, as well as where the aircraft will be in a finite period of time. With the increased situational awareness, the pilot's workload is lower, thereby permitting better flight management.

Flight director guidance for critical maneuvers, such as those maneuvers with very small or reduced margins for error, is often essential for precision navigation requirements. Current flight guidance display sets utilize symbology that is based on compensatory tracking tasks or follow a guidance cue to satisfy (i.e., null) an error signal. Further, current generations of terrain flight guidance systems use radiated emissions and track errors displayed using compensatory tracking symbology (e.g., Delta-Veebar and Two-bar). Such systems operate satisfactorily, but are limited in their ability to display future flight path information to the pilot and/or the results of pilot control input. The display symbology sets are designed to follow command guidance from an off-course situation to return to a nominal (i.e., null error) solution, known as a compensatory tracking task. Thus, such displays cause much "mental gymnastics", cognitive processing, and pilot mental workload, which may lead to additional error.

This traditional symbology used for instrument approaches in vertical flight aircraft, such as rotorcraft or tiltrotors, is based on compensatory tracking tasks. Compensatory tracking tasks are derived by monitoring actual aircraft performance against commanded performance during flight and actual cross-track error against commanded cross-track during flight. Guidance errors are generally computed as the difference between guidance commands and sensed aircraft state. The errors are sent to flight director controls, which generate steering commands. These commands appear as flight director symbology on a cockpit display and direct the pilot where to position the lateral stick (roll), thrust control lever (power), and the longitudinal stick (pitch). If the pilot responds with the appropriate control inputs to satisfy the flight director steering commands, the aircraft will converge on the reference values selected.

Symbology based on compensatory tracking tasks is designed to provide the pilot with command guidance instructing a pilot to make flight adjustments to guide an aircraft from an off-course situation to return to a nominal or null error solution. However, compensatory tracking symbology does not provide the pilot with information indicating how far the aircraft is off course or what flight control input is required to regain course centerline. Therefore, the pilot must constantly monitor flight commands and the results of control inputs.

Furthermore, compensatory tracking does not provide flight path predictability, and displays that utilize compensatory symbology typically require more cognitive processing by the pilot. This causes heavy pilot mental workload that may lead to errors, especially in high workload constrained terminal areas or during low altitude operations. For example, excessive pilot mental workload can lead to full-scale deflection errors or total loss of situational awareness resulting in a maximum deviation mandated missed approach. Thus, compensatory symbology often creates display clutter and high pilot cognitive workload, which increases the risk of flight technical errors (FTE's).

To overcome the shortcomings of guidance systems and symbology based on compensatory tracking tasks, perspective display sets, or three-dimensional (3D) displays, have been developed. Most perspective display sets provide 3D tunnels consisting of a series of rectangles connected by lines through the corners. In particular, perspective display sets are useful for terrain following/terrain avoidance (TF/TA) flights that require accurate elevation and obstacle data for use by aircraft flight director systems to provide the pilot with immediate, real-time flight guidance information. The traditional systems for providing this information and the symbology used for TF/TA aircraft attitude based operations and "null command" compensatory tracking systems are based on radiated/returned sensor data.

Current methodology for guidance for TF/TA operations utilize energy-emitting radiation systems or a multi-mode radar to provide a real-time display of terrain/obstacles ahead of the aircraft. These systems, while accurate, are limited in that the display and data are restricted by the performance of the sensor system. For example, turning limitations from the turn rate/bank angle limiter on some multi-mode radars precludes the system from "seeing" around or into the turn. Further, and for example, current sensor-based systems cannot provide the pilot with reliable "nose over" cueing to enable terrain flight because the emitter sensor cannot "look over" the terrain ahead, but must rely on line-of-sight (LOS) operation.

It is desirable to develop a system and perspective display set that yields better performance results than current navigation systems and perspective symbology sets, as well as providing look ahead functionality and increased situational awareness, causing less display clutter, reducing pilot work load and reducing FTE's.

SUMMARY OF THE INVENTION

An aircraft guidance system of the present invention provides flight path vector (FPV) navigation using known terrain elevation data (e.g., calculated elevation data). Using pathway guidance cognitive processing, the workload required to safely complete terrain following/terrain avoidance (TF/TA) flight at low-altitudes (e.g., between 300–500 feet above ground level) is minimized.

In particular, a guidance system of the present invention attempts to prevent inadvertent flight into terrain and allows terrain-hugging flight to limit intervisibility using terrain elevation data contained within, for example, a digital map system, updated aircraft inertial track data from flight guidance computers and differential global positioning system (dGPS) navigation systems. This information is used in combination with generated perspective flight guidance symbology to enable a pilot to view visual representations of upcoming and lateral terrain.

The system provides a Perspective Flight Guidance (PFG) display that, in one embodiment, utilizes dGPS for waypoint geolocation, combined with a "quickened" predictive FPV symbol and "tunnel-in-the-sky" pathway guidance. The display enables pilots to anticipate avoidance flight requirements, thereby permitting the pilots to fly low to the ground (i.e., terrain flight) while avoiding obstacles (i.e., terrain avoidance) with increased accuracy, reduced intervisibility and reduced workload.

In general, various embodiments of the present invention provide a flight director system and a tunnel generator component for controlling the generation and updating of a PPTG/PFG display, and especially three-dimensional graphical representations and guidance information associated therewith. Specifically, in one embodiment of the present invention an aircraft guidance system includes a flight guidance component configured to determine a current aircraft state; a control component configured to receive information relating to the current aircraft state and comparing the information to a desired aircraft state; and a tunnel generator component configured to receive navigation control inputs and determine a tunnel profile defining a virtual tunnel for display to control guidance of an aircraft and based upon the compared current aircraft state and desired aircraft state. One or more navigation sensors may be provided to determine the current aircraft state and wherein the control component determines guidance errors based upon received current aircraft state information from the one or more navigation sensors and the desired aircraft state. The tunnel generator component further may be configured to determine a flight plan based upon the received navigation control inputs and to define the virtual tunnel based upon the flight plan.

In another embodiment of the present invention, a tunnel generator for generating a tunnel profile to control the display of a virtual tunnel is provided. The tunnel generator includes a flight plan component configured to generate a flight path portion representing a shape of a current desired flight path based upon stored navigation information; a display component configured to receive the generated flight plan portion and to generate a three-dimensional graphical representation of the generated flight plan portion; and a rendering component configured to receive the three-dimensional graphical representation and to generate a predictive three-dimensional virtual tunnel for display. The flight plan component may be configured to receive current aircraft state information and desired flight plan information to generate the flight plan portion and wherein the flight plan portion may include horizontal and vertical flight information. The display component may be further configured to generate a three-dimensional graphical representation that changes shape based upon the shape of the current desired flight plan.

Further areas of applicability of the present invention will become apparent from the detailed description provided hereinafter. It should be understood that the detailed description and specific examples, while indicating certain preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Although the present invention is described in connection with specific systems operating to provide particular displays using specific information, it is not so limited, and the present invention may be provided in connection with other systems providing different or additional displays using different information.

Figure 1:
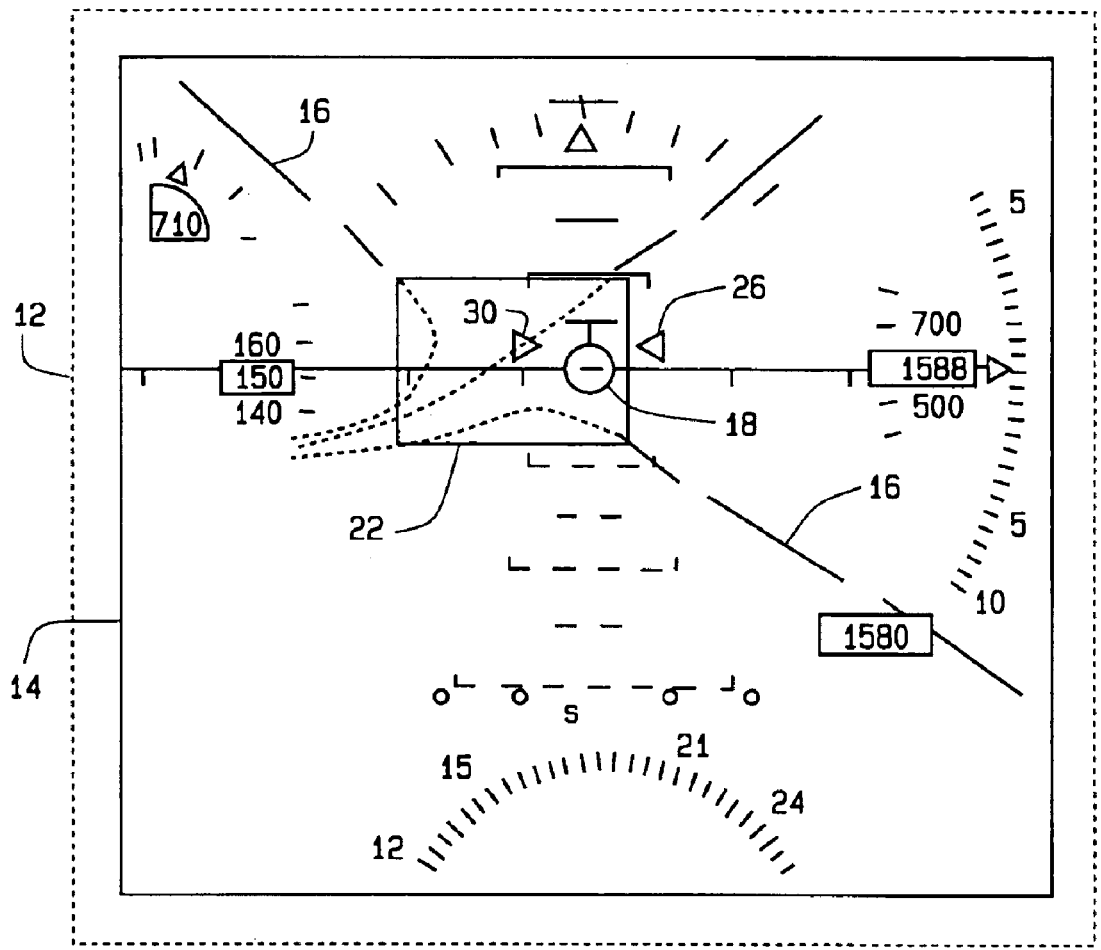
FIG. 1 is a graphical representation of a predictive flight path symbology system including an FPV based precision pathway flight guidance (PFG) symbology set in accordance with one embodiment of the present invention.

Referring to FIG. 1, a graphical representation of a predictive flight path symbology system 10 in accordance with an exemplary embodiment of the present invention is shown. The system 10 includes a flight path vector (FPV) based precision pathway flight guidance (PFG) symbology set 12 and a pilot display 14 on which the PFG symbology set 12 is displayed. The PFG symbology set 12 includes an open tunnel bounded by broken tunnel lines 16 that provides flow field data, such as, for example a Boeing Philadelphia broken line open tunnel; a quickened flight path vector (QFPV) symbol 18 that indicates predictive aircraft state and a quickened command reference frame 22 symbol into which a pilot is to place the QFPV symbol 18. Additionally, the PFG symbology set 12 includes a pitch trim cue or symbol 26, such as, for example, a NASA Ames longitudinal trim command cue, that is utilized by the pilot to maintain a desired aircraft pitch, and a power trim cue or symbol 30, such as, for example, an Ames power cue, that is utilized by the pilot to maintain a desired trim on the aircraft.

Figure 3:
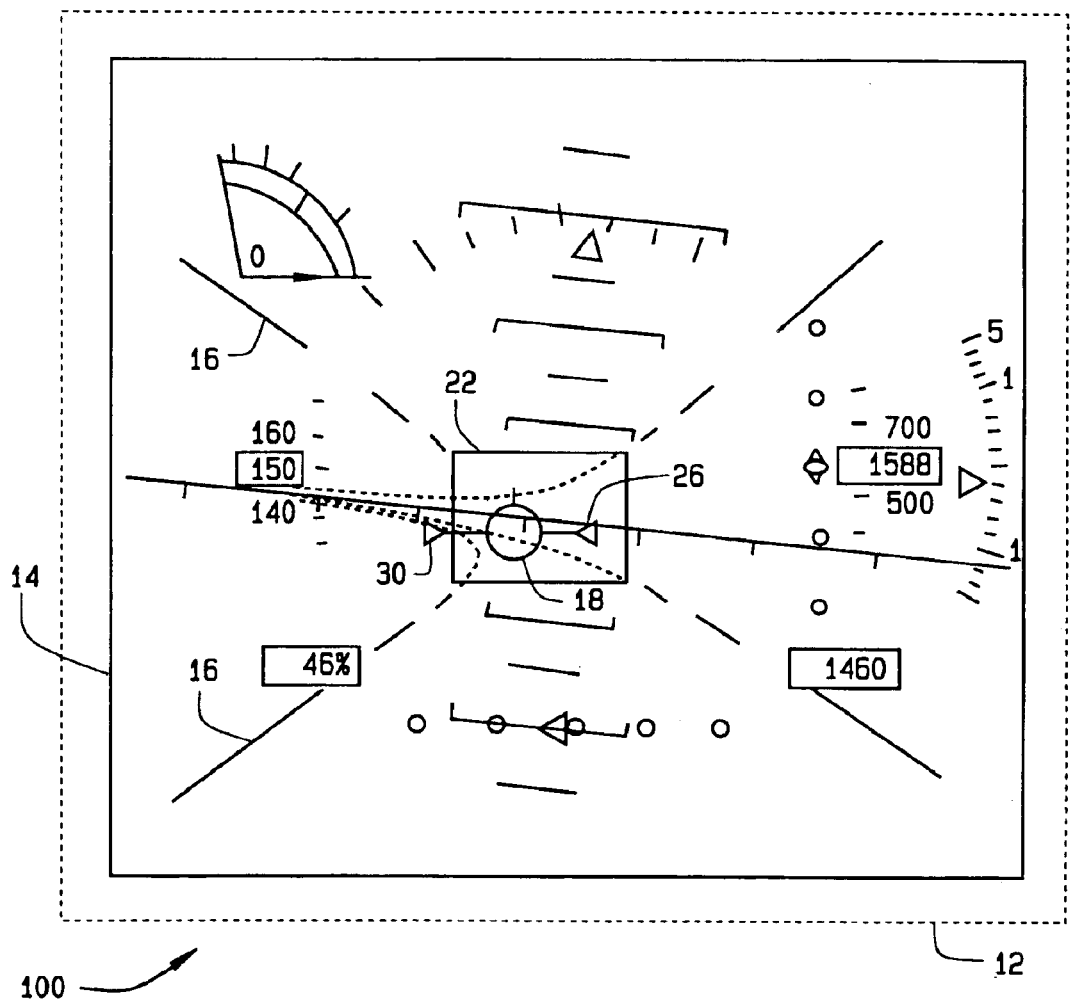
FIG. 3 is a graphical representation of the symbology system shown in FIG. 1 utilized with a 3D database.
Figure 7:
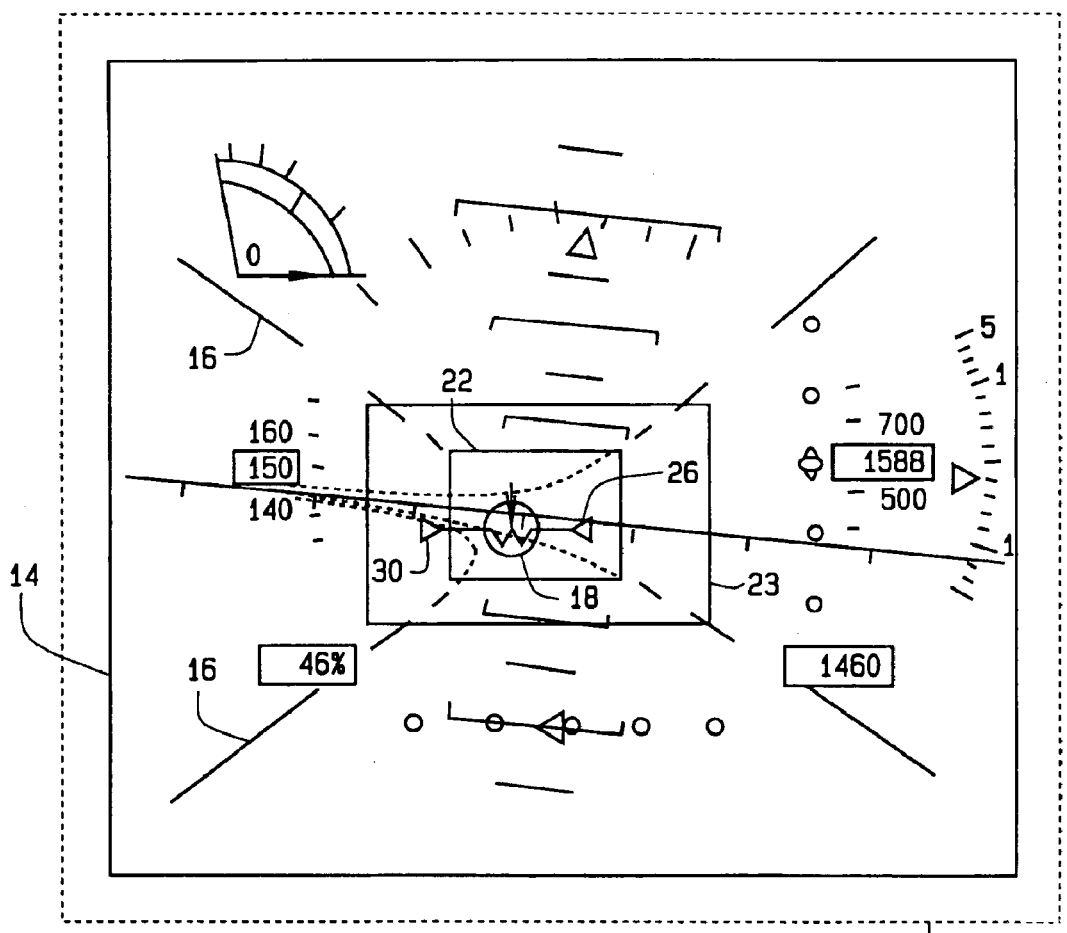
FIG. 7 is a graphical representation of another embodiment of a predictive flight path symbology system utilized with a 3D database.
Figure 11:
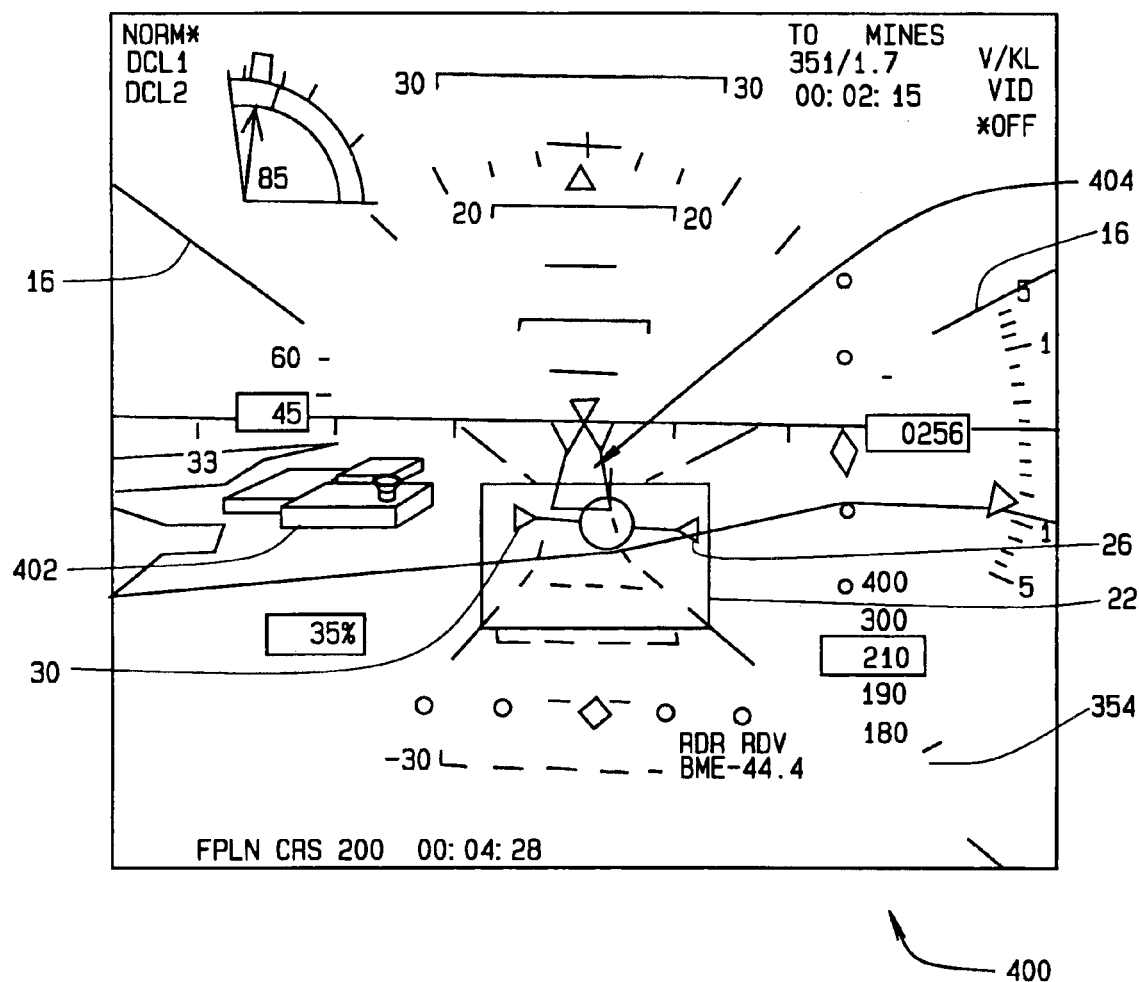
FIG. 11 is an exemplary display showing one embodiment of a multi-layered display of the present invention having a predictive flight path symbology system overlaying a representation of a three-dimensional terrain.

The PFG symbology set 12 provides pilots of rotorcraft/tiltrotor aircraft, or any suitable airborne platform, with an intuitive symbology set. Using a high resolution two dimensional (2D) database (not shown), or three dimensional (3D) database (not shown), as described in more detail herein, the PFG symbology set 12 combines precision waypoint geolocation with quickened predictive flight-path-vector and "tunnel-in-the-sky" pathway guidance. A 2D database displays the PFG symbology set 12 either overlaying a map type display or accompanied by a map type display, as shown in FIG. 1. A 3D database displays the PFG symbology set 12 either overlaying a synthetic vision type display or accompanied by a synthetic vision type display, as shown in FIGS. 3, 7 and 11 described below. Waypoint geolocation can be determined by any suitable positioning system, such as a global positioning system (GPS) or differential GPS (dGPS).

When employed on an aircraft guidance display, the PFG symbology set 12 presents a fully anticipatory perspective display, wherein the pilot has a pictorial display of the path (e.g., flight path) to follow. The PFG symbology set 12 provides a tunnel type guidance system, which requires reduced pilot cognitive process because a pilot merely needs to "stay between the lines." For example, the PFG symbology set 12 may show an above glide slope condition indicating a requirement to increase descent gradients and reduce power and/or increase rate of descent. The PFG symbology set 12 is anticipatory, such that it shows the pilot exactly where he/she is, and needs to be, thereby providing the pilot with an immediate indication of aircraft reaction to any control input, and immediately whether the control input satisfies a required demand.

The QFPV symbol 18 is quickened, such that the QFPV symbol 18 is temporally placed at a finite distance or period of time ahead of the aircraft. Thus, the QFPV symbol 18 identifies (e.g., points to) where the aircraft will be at that fixed future moment in time. This allows the pilot to anticipate the direction and amount of control input required to fly a required path or track, as well as the predicted result of that input.

As shown in FIG. 1, the open tunnel bounded by broken lines 16 displays a predetermined amount of the tunnel or pathway, thereby reducing display clutter. For example, a predetermined time period (e.g., sixty seconds) of the tunnel is displayed. Broken lines 16 provide flow field data. The tunnel or pathway provides anticipatory flight control input cues to the pilot by banking, climbing, descending, and turning as the pathway turns and descends or climbs. To fly the pathway, pilots keep the QFPV symbol 18 within the quickened command frame 22, which is displayed temporally in front of the aircraft, for example 4.5 seconds. In one exemplary embodiment, tunnel height and width follow a four-fifths format that is linear as a function of airspeed. For example, tunnel height and width will vary from a maximum of 400×500 feet at air speeds above 250 KCAS to a minimum of 100×125 feet at air speeds less than or equal to 50 KCAS.

In particular, the quickened command frame 22 is quickened to be a predetermined fixed distance or time period ahead of the aircraft path and to be cotemporal and coplanar with the QFPV symbol 18. Additionally, the quickened command frame 22 remains displayed at the fixed distance or period of time in front of the aircraft regardless of air speed. The quickened command frame 22 is used to indicate a command location in which the pilot places the QFPV symbol 18 to satisfy tracking requirements.

A pitch trim cue 26 and power command cue 30 are preferably displayed as command triangles at the ends of the QFPV symbol 18. Specifically, the pitch trim cue 26 is used to indicate the proper longitudinal pitch needed to maintain the QFPV symbol 18 within the quickened command frame 22. In one embodiment, the pitch trim cue 26 is an orange delta displayed adjacent a right wing of the QFPV symbol 18. The pitch trim cue is a "FLY TO" command. The pilot maintains a desired pitch of the aircraft by maneuvering the aircraft so that the right wing of the QFPV symbol 18 remains aligned with the pitch trim cue 26. The power command cue 30 is used to indicate power requirements needed to maintain the QFPV symbol 18 within the quickened command frame 22. In one embodiment, the power command cue 30 is a yellow delta adjacent a left wing of the QFPV symbol 18. The pilot maintains a desired trim of the aircraft by maneuvering the aircraft so that the left wing of the QFPV symbol 18 remains level with the power trim cue 30. The power command is a "NULL or FLY FROM" command.

In this embodiment, the power command cue 30 moves within a range above and below the QFPV symbol 18 (e.g., ±0.85 inches above/below). Motion above the QFPV symbol 18 is an indication to reduce the thrust control lever (TCL), and motion below the QFPV symbol 18 is an indication to increase the TCL. The pitch trim cue 26 also moves within a range above and below the QFPV symbol 18 (e.g., ±1.25 inches above/below). Motion above the QFPV symbol 18 is an indication to pull back on pitch cyclic (i.e., trim up/aft), and motion below the QFPV symbol 18 is an indication to push forward on pitch cyclic (i.e., trim down/forward). By using the pitch trim cue 26 and the power command cue 30, a pilot nulls both a longitudinal trim command and a power command, thereby satisfying requirements to hold airspeed and altitude.

Figure 2:
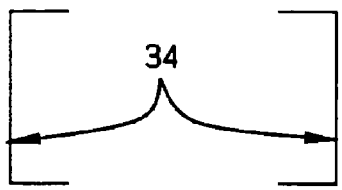
FIG. 2 shows a half bracket symbol included in the PFG symbology set shown in FIG. 1.

FIG. 2 shows a half bracket symbol 34 included in the PFG symbology set 12 (shown in FIG. 1). FIG. 2 shows the half bracket 34 in two configurations. In a first configuration, the half bracket 34 is shown having legs extending in a first direction, for example right or down. In the second configuration, the half bracket 34 is shown having legs extending in a second direction opposite the direction shown in the first configuration, for example left or up. The half bracket 34 indicates when the pilot is out of the tunnel. The half bracket 34 is designed to be directional such that the half bracket 34 indicates whether the tunnel is above, below, left, or right. By knowing were the tunnel is with respect to the aircraft, the pilot can redirect the aircraft so that the QFPV symbol 18 (shown in FIG. 1) re-intercepts the tunnel. When a pilot utilizes the half bracket 34 to guide the aircraft on a flight path that will cause the QFPV symbol 18 to re-intercept the tunnel, as the aircraft reaches a reciprocal heading, i.e. 180° of turn away from the tunnel, the half bracket 34 will convert from the first configuration to the second configuration, thereby indicating that the pilot is now turning toward the tunnel.

FIG. 3 shows a graphical representation of a predictive flight path symbology system 100 of the present invention, including an FPV vector based PFG symbology set 12 (shown in FIG. 1) utilized with three-dimensional data stored within a database 204 (shown in FIG. 5) as described in more detail herein. Components in FIG. 3 identical to components in FIG. 1 are identified in FIG. 3 using the same reference numerals as used in FIG. 1. While the two dimensional (2D) display illustrated in FIG. 1 uses 2D data to provide a display in two dimensions, for example height and width, three dimensional (3D) data is used to provide the display in FIG. 3 and provides a display in three dimensions, for example height, width and depth, thereby depicting objects with perspective. When the PFG symbology set 12 is utilized with 3D data, the PFG symbology set 12 may be displayed either overlaying a synthetic vision type display or accompanied by a synthetic vision type display. Overlaying the PFG symbology set 12 on a synthetic vision display allows the pilot to not only see the course to fly, but the relationship of the underlying terrain. Therefore, this reduces the visual and mental interpretation required by the pilot.

It should be noted that while embodiments of the symbology set of the present invention are especially suited for use in aircraft performing steep approach angles, or aircraft required to descend and decelerate to a hover, or near hover, the embodiments are not limited to such applications and are applicable for use in any aircraft. Thus, the PFG symbology set 12 may be designed and implemented to replace traditional, workload intensive, Two-Bar and Delta-Veebar flight director terminal approach guidance, while providing smaller FTE and reduced pilot workload.

Thus, various embodiments of a predictive flight path symbology system 10, 100 include dashed or broken lines 16 that define the corners of a tunnel to provide the temporal effects of motion through the tunnel (e.g., flow field effects) and aircraft speed relative to the tunnel. For example, the broken lines 16 may represent 150 feet in length with 150 feet of space therebetween. Further, the broken lines 16 project the tunnel for a predetermined period of time (e.g., 60 seconds) ahead of the aircraft current position to provide the predictive nature of the tunnel. In operation, the various embodiments of a predictive flight path symbology system 10, 100 and the PFG symbology set 12 provide an instrument approach guidance symbology system that enables pilots to execute steep (i.e., >4° glide slope) and normal (i.e., ≦4° glide slope) precision instrument approaches during, for example, instrument meteorological conditions (IMC) and/or instrument flight rules (IFR) flight. Additionally, the PFG symbology set 12 enables a pilot to execute normal IMC flight, IFR flight, and low-altitude TF/TA in near zero visibility.

Having described various embodiments of a PFG symbology set 12 of the present invention, one embodiment of a control system for use in generating such a symbology set will now be described. In particular, and for example, a PFG symbology set 12 including TF/TA symbology may be generated using a control system as described herein and provided on a display. In general, various embodiments of a Perspective Flight Guidance Terrain Flight/Terrain Avoidance (PFG TF/TA) system of the present invention provide pilots with guidance information having an intuitive symbology set. This guidance system is provided using a high resolution 3D or 4D-like database. In one embodiment, the PFG symbology 12 set provided as part of the guidance system utilizes dGPS for precision waypoint geolocation, and combined with the quickened predictive FPV and "tunnel-in-the-sky" pathway to provide an intuitive predictive flight path symbology system 100 (shown in FIG. 3).

Figure 4:
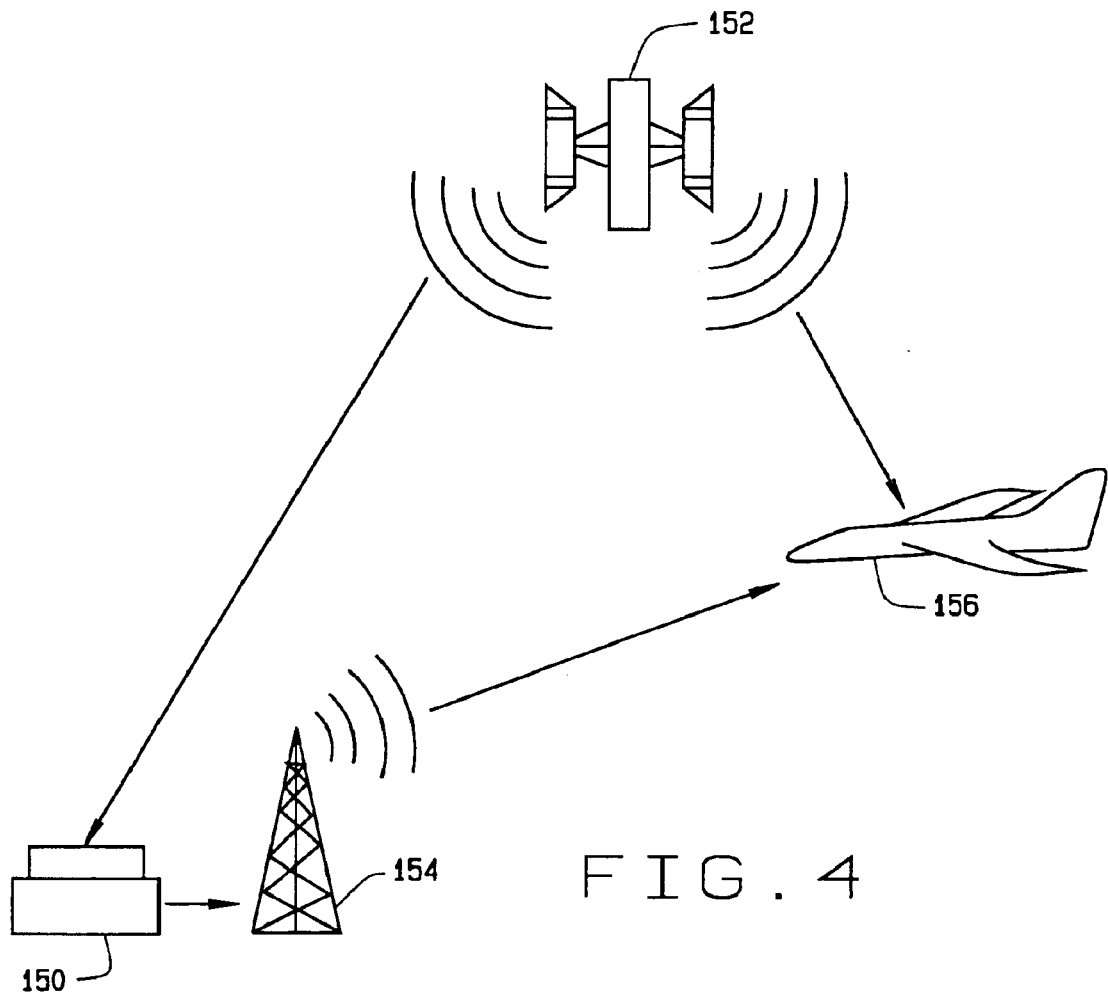
FIG. 4 is a simplified schematic diagram of a dGPS system in connection with which embodiments of the present invention may be implemented.

Specifically, and in one embodiment as shown in FIG. 4, dGPS is used to locate and update the position of the aircraft, which also provides for updating the display having the PFG symbology set 12. Typically, when using dGPS, a reference station 150 is provided at a known location. Using the reference station, errors in satellite signals can be determined. This is accomplished by measuring the distance to each of the satellites 152 using the signals received and comparing these measured distances to the actual distances measured from the known position of the reference station 150. The difference between the measured and calculated distance for each satellite 152 is the correction (i.e., differential correction) value. The differential correction values for each tracked satellite are transmitted by a transmitter 154 of the reference station 150 as a correction message. The correction message is received by a dGPS receiver (not shown) on-board an aircraft 156. These correction values are used to correct errors and improve accuracy of the GPS system and location data provided by the system. It should be noted that embodiments of the present invention are not limited to dGPS, but may be provided using GPS or other systems providing location information.

Figure 5:
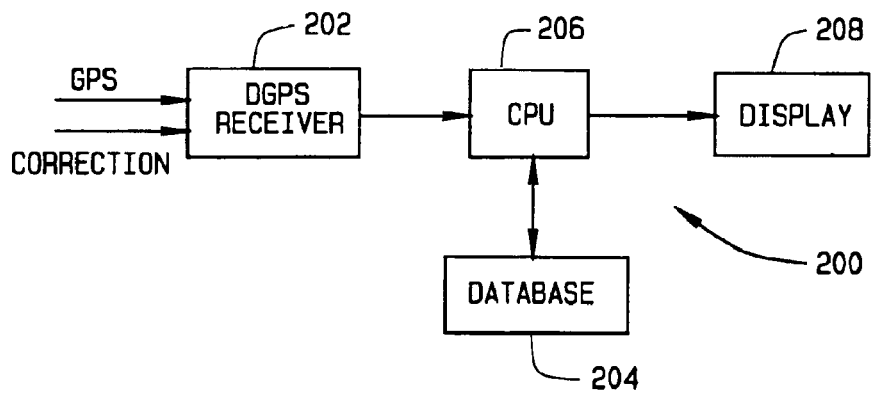
FIG. 5 is a simplified block diagram of one embodiment of a control system of the present invention.

Referring now to FIG. 5, and one exemplary embodiment of a control system 200 of the present invention, the control system includes a dGPS receiver 202 for receiving a dGPS signal providing the position or location of the aircraft 156, and a correction value as described herein. It should be noted that the correction value is received when the signal is a dGPS, but when other signals are used to track the aircraft (e.g., GPS signal), the correction value may not be provided. Specifically, the PFG symbology set 12 (e.g., TF/TA symbology) is driven by altitude data derived from a terrain digital map and digital feature analysis data/digital terrain elevation data (DFAD/DTED) within an on-board database 204. Aircraft position is provided by an inertial navigation system/dGPS (INS/dGPS) update of actual aircraft position using the GPS and correction value signals received by the dGPS receiver 202, which is then updated and validated against an actual digital map position and an INS predicted position. Specifically, terrain elevation data from a terrain digital map stored within the database 204 and aircraft altitude from an onboard GPS air data system and a radar altimeter is provided to aircraft flight data computers 206. The elevation data and aircraft altitude are then compared against predicted or required actual aircraft altitude and a selected or commanded low altitude clearance. Errors from commanded and actual, or predicted elevation and aircraft position are provided to the pilot as the base of the tunnel pathway to be flown as shown on a display 208 of the aircraft 156. Thus, terrain elevation data in combination with aircraft inertial track data from flight guidance computers (e.g., a flight director system) and dGPS navigation systems are used to generate the tunnel pathway for display. It should be noted that the database 204 may contain any type of terrain or other digital map data as is known, and as needed or required. Further, this data may be updated periodically (e.g., monthly) or as desired or needed.

Figure 12:
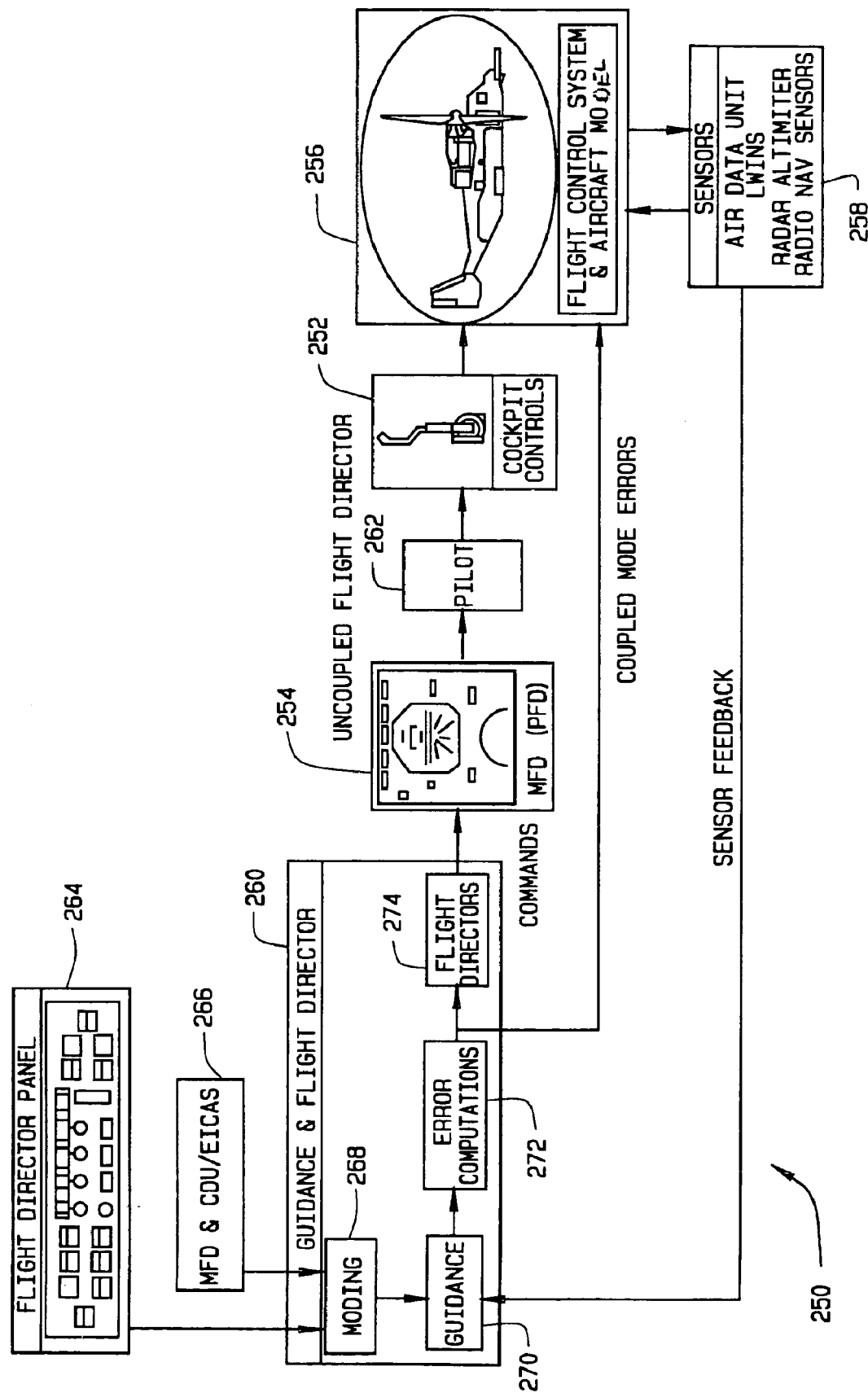
FIG. 12 is a block diagram of one embodiment of a flight director system according to the present invention.

More particularly, and as shown in FIG. 12, a flight director system 250 operates as a closed-loop system to guide the aircraft 156 based upon flight guidance commands and provide a display (e.g., updating the display) having a predictive flight path symbology system 10,100 and PFG symbology set 12 displayed thereon. The flight director system 250 is shown in exemplary form as a V-22 flight director. The flight director system 250 generally includes cockpit controls 252 and displays (e.g., Multi-Function Display (MFD) 254, including a Primary Flight Display (PFD)), an aircraft/flight control system 256, navigation and air data sensors 258, and a computer 260 or other suitable processor.

Specifically, and with respect to the cockpit controls 252 and displays, flight director commands are used for the primary display for operation and are provided on the MFD 254, and in particular the PFD or on Vertical Situation Display (VSD) pages. The pilot 262 completes the system loop closure by maneuvering the aircraft 156 using the cockpit controls 252 until the flight director commands are aligned with the waterline symbol or FPV symbol, and more preferably, the QFPV symbol 18. A Flight Director Panel (FDP) 264, along with a Control Display Unit (CDU) and MFD controls 266 are also provided, for example to the crew on the aircraft 156, to control various parameters associated with each flight director mode as described herein.

The aircraft/flight control system 256 translates cockpit flight control position commands (e.g., longitudinal/lateral stick, pedals, thrust control lever (TCL), and nacelle thumbwheel commands or actions) into nacelle, rotor control (e.g., longitudinal/lateral cyclic and symmetric/differential collective pitch) and control surface (e.g., elevator, flaperon, and rudder) position commands necessary to maneuver the aircraft 156.

The navigation and air data sensors 258 include navigation and air data sensors used by the flight director system 250, and in one embodiment, include a Light Weight Inertial Navigation System (LWINS), an Air Data Unit (ADU), a radar altimeter, and VOR/ILS/Marker Beacon Receivers (ARN 147). The LWINS is aided by a Miniaturized Airborne GPS Receiver (MAGR). In operation and in one embodiment, primary sensor feedback required for flight director operation include true airspeed, calibrated airspeed, position, velocity, acceleration, barometric altitude, radar altitude, flight path angle, attitude, and Electronic Navigation (ENAV) deviations.

The computer 260 processes primary functions of the flight director system 250 including mode control, guidance and error computations, and flight director control law equations as described herein in more detail. In particular, a mode control component 268 processes pilot selected mode commands from the Flight Director Panel (FDP) 264 or Thrust Control Lever (TCL) grip provided as part of the cockpit controls 252 to activate different modes. A guidance component 270 computes flight guidance commands. The commands are compared to aircraft state feedback information (e.g., as provided by the navigation and air data sensors 258) to compute guidance errors 272. Flight director control law equations 274 process guidance errors and compute command displacements to send to the display system (e.g., aircraft cockpit display) for updating the display.

With respect to flight director control provided by the flight director system 250, FPV symbol quickening procedures are provided. Further, incorporation of altitude and speed modes may be provided to drive pitch and power cue symbology and two-bar symbology with tunnel guidance. Also, calculations of vertical and lateral deviations based on aircraft position relative to the tunnel may be provided.

Specifically, the QFPV symbol 18 is quickened vertically with compensation for pitch attitude and TCL position. In particular, and in one embodiment, the following equation is preferably implemented:

FPV vertical displacement=FPV vertical displacement+ FPV vertical quickening.

FPV vertical quickening compensates for lags in the aircraft's response to pitch and power inputs made, for example, to follow a pursuit aircraft or forward-looking tunnel guidance.

It should be noted that the pitch trim cue 26 and power command cue 30 are driven with the same flight director control equations that drive the two-bar display operation. This includes processing altitude and speed errors and mixing equations to drive longitudinal cyclic and TCL commands to null the errors.

With respect to lateral guidance to drive, for example, a two-bar vertical bar with tunnel guidance and/or lateral quickening of the QFPV symbol 18, in one embodiment, lateral quickening equations are preferably implemented as follows:

FPV horizontal displacement=FPV horizontal displacement+FPV lateral quickening

The FPV lateral quickening term is determined from an approximation of future cross track error/deviation. This is comprised of a cross track deviation component, a track angle error component, and a bank angle component.

Figure 6:
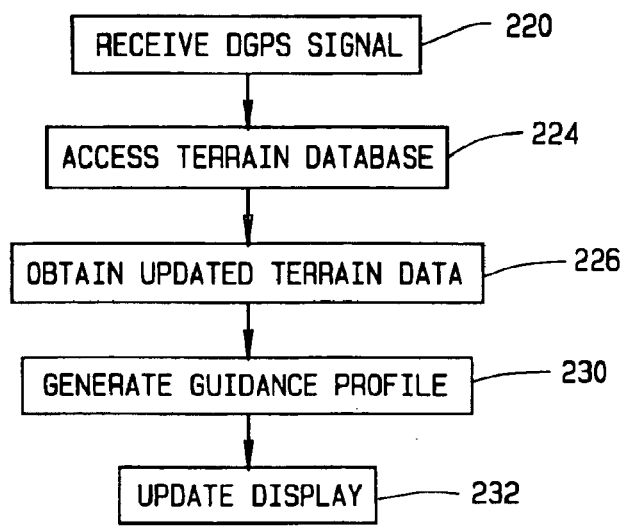
FIG. 6 is a flow chart of one embodiment of a control process implemented by a control system of the present invention for providing a predictive flight path symbology system including an FPV based PFG symbology set.

Thus, using the flight director system 250 to provide aircraft state information and feedback information (e.g., feedback based upon a user input navigation change), and the control system 200, a more preferred operation of the control system 200 may be provided as shown in FIG. 6. Specifically, at step 220 the dGPS receiver 202 receives aircraft position data such as the GPS and correction value signals, which are used to determine aircraft position. The database 204 is then accessed at step 224 to determine terrain data, including terrain elevation data for the received position (e.g., terrain elevation for a specific location stored in the database 204 and defined by a longitude and latitude). At step 226, updated terrain data, for example, from a terrain digital map and DFAD/DFTED terrain elevation data is obtained (e.g., details regarding the height of terrain at the particular location). Specifically, terrain elevation data from the terrain digital map and aircraft altitude from an air data system and a radar altimeter provided as part of the flight director system are provided to aircraft flight data computers 206. Then, at step 230, an updated guidance profile is generated for use in updating the predictive flight path symbology system 100 on the display 208 (e.g., to update the tunnel pathway). In particular, the elevation data and aircraft altitude are compared against predicted or required actual aircraft altitude, and a selected or commanded low altitude clearance (i.e., minimum clearance threshold) to determine a difference in the compared information (e.g., deviation from required actual aircraft altitudes). The display 208 is then updated (e.g., PFG symbology set and tunnel updated) at step 232 based upon the updated guidance profile (e.g., based upon the composition). However, it should be noted that other actual and desired or required aircraft state information may be used to generate an updated guidance profile.

Referring now to one embodiment of a tunnel generator component, it preferably uses guidance equations and guidance information (e.g, feedback information from the flight director system 250), and as described in more detail herein, to generate tunnel profiles from, for example, flight plans of specified waypoints, having specified locations (e.g., latitude and longitude) and conditions (e.g., barometric altitude, knots true airspeed (KTAS)). Additional information may be provided in connection with each waypoint, including, for example, turn-rate and roll-in, roll-out rates in the event a turn is required between waypoints. Thus, tunnel profiles are generated with constant speed, height, bank, and turn-radius turns. It should be noted that an alternately, modifications may be provided for flight legs that require a change in altitude and course between waypoints. This condition requires a curve fit routine to be implemented to generate a smooth profile.

Figure 13:
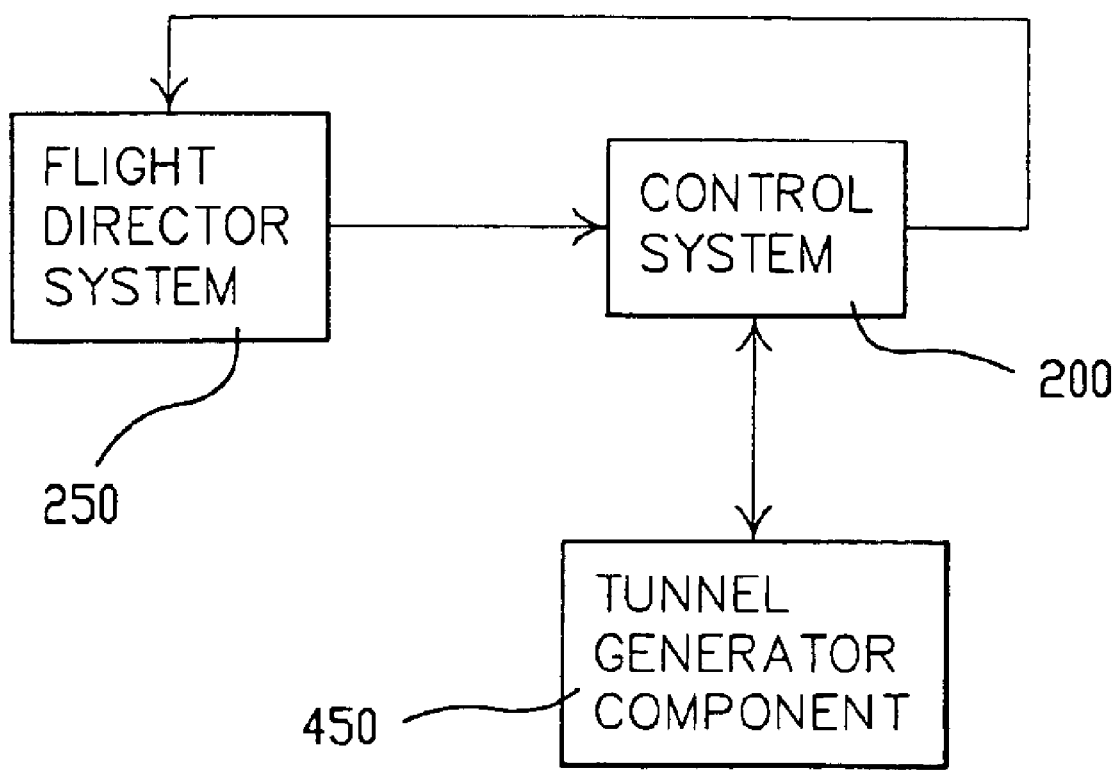
FIG. 13 is a block diagram showing one embodiment of a tunnel generator component of the present invention in connection with a flight director system and control system.

In general, and as shown in FIG. 13, the tunnel generator component 450 generates flight plan guidance (e.g., flight plan profiles) based upon input conditions and navigation information (e.g., current aircraft state information received from the flight director system 250) and is controlled by the control system 200, which displays tunnel graphics on the display 208 (shown in FIG. 5), including, for example, the various embodiments of the predictive flight path symbology system 10,100. It should be noted that because MFDs typically display information in a two-dimensional format, the tunnel generator component 450 creates a tunnel that exists in four dimensions, including space and time. Thus, a re-rendering of conventional PFD and VSD symbology (e.g., waterline symbol, FPV symbol, pitch ladder, etc.) to conform to a 3-dimensional field-of-view (FOV) with perspective is performed. Further, lateral and vertical deviations from the tunnel centerline are preferably calculated from the point on the tunnel closest to the current aircraft position.

The tunnel generator component 450 also preferably provides lead compensation, a curve-fit option, desired vertical velocity computation, as well as selectable FOV and an FPV-centered display as described herein. Lead compensation is provided based upon the values of tunnel output signals at some specified time ahead of the current time frame, for example, at the command-frame look-ahead time. For example, in one embodiment, a third-degree polynomial curve-fit routine to calculate the tunnel path through the specified waypoints is provided. In another embodiment, a fifth-degree polynomial curve-fit routine, bounded by a glideslope-blending requirement is provided.

Further, additional signals and moding control laws may be provided to control the tunnel generator component 450 during real-time core mode operations. For example, an option to add biases to the reference values may be included to give step-input capability and bypass the dialing process with the flight director panel 264 for checkout purposes. Also, the tunnel generator component 450 may be modified to drive the two-bar symbol with the tunnel desired heading/course using current aircraft gains and constants for comparison purposes.

Lead compensation may be provided in the form of the values of tunnel output signals at some specified time ahead of the current aircraft position. The particular signals may include tunnel desired altitude and desired vertical velocity. These signals feed into the error signal computations 222 that are used to drive the pitch and power cues represented as the pitch trim cue 26 and power command cue 30.

In one embodiment, operating requirements for the tunnel generator component 450 may be provided as follows:

Heading Hold:
1) if reference value dialed on flight director panel 264 is equal to current heading, activating system renders a tunnel straight and centered in ADI; if altitude mode is not selected then tunnel will remain vertically centered, essentially floating with aircraft altitude changes;
2) if reference value dialed on flight director panel 264 is not equal to current heading, activating system renders a tunnel centered in ADI that eventually turns to course yielding reference value; turns based on specified turn rate, specified roll rate, and current ground speed; if altitude mode is not selected then tunnel will remain vertically, centered essentially floating with aircraft altitude changes.

Heading Select: once system is active, dialing a new reference value on the flight director panel 264 produces a tunnel that eventually turns from the current heading to the course yielding the reference value; turns based on specified turn rate, specified roll rate, and current ground speed; vertical behavior same as hold mode.

Altitude Hold:
1) if reference value dialed on flight director panel 264 is equal to current altitude, activating system renders a tunnel straight and centered in ADI; if heading mode is not selected then tunnel will remain horizontally centered, essentially sliding with aircraft heading changes;
2) if reference value dialed on flight director panel 264 is not equal to current altitude, activating system renders a tunnel centered in ADI that eventually climbs or dives to the reference value; climbs and dives based on specified pushover/pullup rate and current ground speed; if heading mode is not selected then tunnel will remain horizontally centered, essentially sliding with aircraft heading changes.

Altitude Select: once system is active, dialing a new reference value on the flight director panel 264 produces a tunnel that eventually climbs or dives from the current altitude to the reference value; climbs and dives based on specified pushover/pullup rate and current ground speed; horizontal behavior same as hold mode Input parameters are preferably received by the tunnel generator component 450 for use in calculating and generating a tunnel profile. In one embodiment, the following input parameters are provided:

tunnel look-ahead time, sec
tunnel segment length, ft
tunnel segment spacing (from front of one to the front of the next), ft
total number of waypoints, including go-around
waypoint name
north database coordinate, ft
east database coordinate, ft
reference altitude, barometric, ft
tunnel width, ft
tunnel height, ft
reference speed, KCAS
maximum turn rate, deg/sec
maximum roll rate, deg/sec
pushover/pullup rate onto new glideslope (deg/sec)

fifth degree polynomial curve fit option
waypoint type (1—approach, 2—go-around)

More particularly, the 3D perspective tunnel provided as part of the predictive flight path symbology systems 10,100 provides predictive guidance with a tunnel that includes navigation information ahead in time and space representing the desired navigation path. The tunnel pitches and rolls in an appropriate flight platform manor allowing a pilot to visually view the positional and attitude state of the aircraft in the near future. The distance in front of the current position that the tunnel is drawn is a tunable parameter. The tunnel width and height may also be modified to represent safe and/or desired error ranges for the flight path. The color, length, and spacing of the line segments that are used to visually represent the tunnel also may be adjusted as needed. These adjustments (e.g., the tunnel look-a-head distance, the tunnel width and height, and the visual aspects of the tunnel line segments) may be adjusted in real-time.

Further, an EADI provides traditional attitude and instantaneous flight path information. The FOV of the EADI is configured to conform to the current FOV of a 3D scene. The 3D scene includes the perspective tunnel and any synthetic vision representation of the out-the-window scene as described herein. It should be noted that the symbology of the EADI may be turned on and off, allowing the configuration of the EADI to match the current requirements (e.g., there is no need to have the EADI draw a Sky/Ground representation when a synthetic vision out-the-window scene visual is present).

In operation, the tunnel generator component 450 preferably operates in two modes, including a flight plan mode and a core mode. In flight plan mode, the tunnel generator component 450 renders and provides guidance along a tunnel created from a predefined flight plan entered using a collection of waypoints. In core mode, the tunnel generator component 450 renders and provides guidance along a tunnel that represents a heading hold, an altitude hold, or both. The values for the headings and/or altitudes used in core mode may be provided from real-time pilot defined inputs. The core mode tunnel preferably adjusts as needed to represent the current state of these commanded values.

Flight plan mode is used when guidance is heeded to navigate along a known, desired ground-referenced flight path. The flight plan is entered as a collection of waypoints that define the shape of the path. The desired airspeed, altitude, and turn rate at each waypoint, as well as the spatial location of each waypoint, is used to create a flight path the aircraft can follow. The tunnel rolls in, banks, and rolls out at each waypoint the appropriate amount to provide smooth lateral transitions between the straight segments that connect the waypoints. The tunnel also climbs and dives with smooth pitch changes to achieve the vertical component of the flight path. The smooth pitch changes are achieved through fifth degree polynomial glideslope blending as described herein.

When a core mode (e.g., heading hold, altitude hold) is enabled, the pre-programmed flight plans are ignored, and a new, real-time adjusted, flight path is created. This new flight path is created to represent the desired hold operation. If only heading hold is enabled, the tunnel emanates from the current location in the commanded heading direction. The tunnel will always be shown at the current altitude. If only altitude hold is enabled, the tunnel is shown at the desired altitude, but goes forward in the current heading. If both heading and altitude hold are enabled, the tunnel goes in the direction of the commanded heading at the altitude of the commanded altitude. While in a hold mode, if the commanded attribute that is being held is changed, the tunnel will provide a smooth transition to the new commanded state.

Further, the tunnel generator component 450 preferably operates in three coordinate systems. The first is the Geodetic Coordinate System in which a location on the Earth is specified by longitude (e.g., in degrees East or West of the Prime Meridian) and latitude (e.g., degrees North or South from the Equator), and altitude is specified by height above Mean Sea Level (MSL). Thus, this coordinate system is generating spherical coordinates (e.g., approximating the shape of the Earth).

The second coordinate system is a flat, rectangular system used for local region calculations of East, North, and Up (ENU). In this coordinate system, location is preferably specified by units East and North of the coordinate system origin (e.g., located on the Earth by a geodetic pair), and altitude is specified height above Mean Sea Level (MSL). This rectangular, right-handed system provides a convenient and efficient coordinate system for building the tunnel representation of the flight plan.

The third coordinate system is the coordinate system for the Tunnel Render Manager component 400, which is an XYZ coordinate system. This rectangular, right-handed system is similar to the ENU system with the X component the same as the ENU East component, the Y component the same as the ENU Up component, and the Z component the negative of the ENU North component.

Specifically, the Geodetic coordinate system represents a location on Earth by specifying longitude (e.g., in degrees East or West if the Prime Meridian), latitude (e.g., degrees North or South of the Equator), and height above Mean Sea Level (MSL) in feet. A single component of a latitude/longitude pair is preferably represented in degrees, minutes, and seconds. The degrees and minutes are stored as integer values and seconds is stored as a double precision floating point number, with North and East marked as 'positive' and South and West marked as 'negative'. As an example, 30.5 degrees North Latitude is represented by +30 degrees, 30 minutes, and 0.0 seconds. For another example, 120.78 degrees West Longitude is represented by −120 degrees, 46 minutes, and 48.0 seconds. This three-stage representation provides an accurate storage system for geodetic components with negligible round-off and truncation errors.

The tunnel generator component 450 uses the East, North, and Up (ENU) right-handed rectangular system for the local area in which the tunnel is being represented. In this coordinate system, the East component represents the number of feet East from the local origin, which is usually specified as a Geodetic Longitude/Latitude pair; the North component represents the number of feet North of the local origin; and the UP component represents the number of feet above Mean Sea Level (MSL). The ENU system provides numerical signs in agreement with those of their geodetic counterparts. Thus, tunnel part placement calculations are performed in the ENU coordinate system.

When the tunnel is rendered, the data must be represented in the coordinate system of the rendering system. In one embodiment, this coordinate system is an XYZ system that specifically represents positive X as the horizontal direction of the view screen (e.g., cockpit display screen) from left to right, positive Y as the vertical direction of the view screen from bottom to top, and positive Z as coming out of the view screen towards the viewer. More generally, this representation is expanded to assume that the eye of the viewer (e.g., pilot) is at sea level, looking North so that X is East, Y is up, and Z is negative North (i.e., South).

In one embodiment, the conversion between the geodetic and rectangular coordinate systems assumes a spherical Earth with a circumference of 40,003,200 meters (i.e., radius of 6366707 meters, 1852 meters per second of latitude, and 3.2808 feet per meter). If a more complex Earth model is desired, the routines providing the conversion may be modified accordingly. In operation, conversion between the XYZ and ENU coordinate systems is provided as follows: X is equal to East, Y is equal to Up, and Z is equal to negative North.

Figure 14:
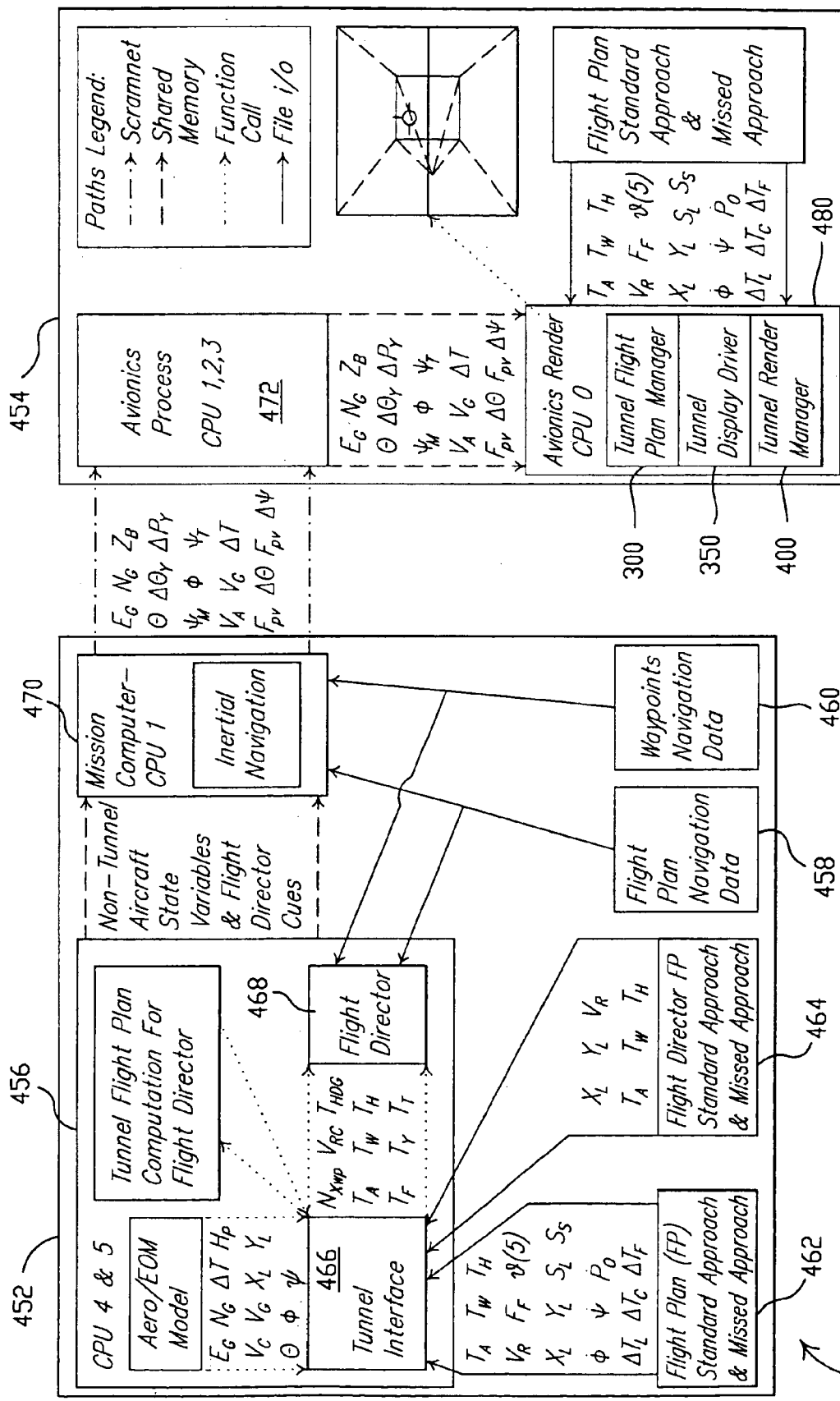
FIG. 14 is a block diagram of one embodiment of a tunnel generator component of the present invention.
Figure 15:
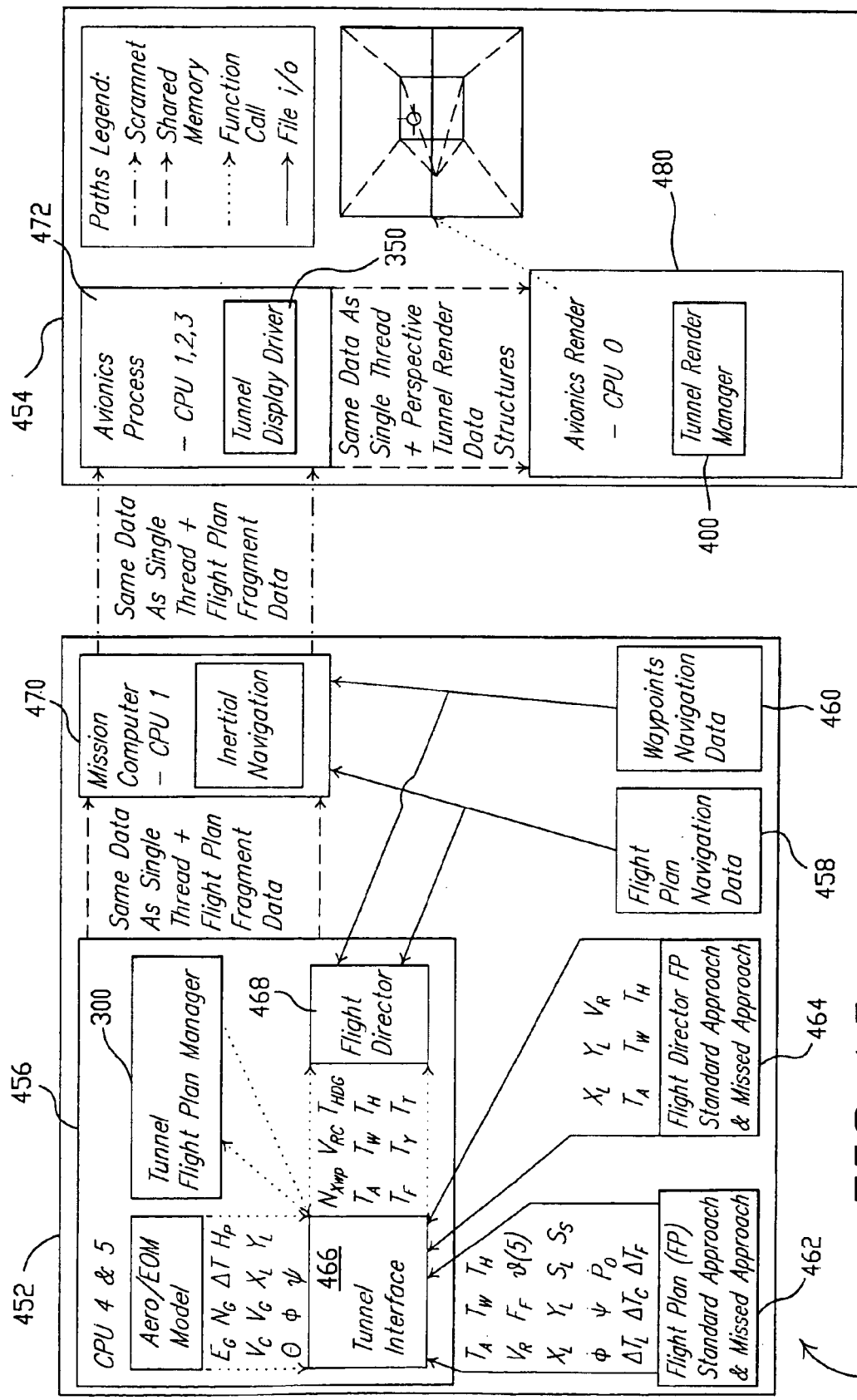
FIG. 15 is a block diagram of another embodiment of a tunnel generator component of the present invention.

In one exemplary embodiment, the tunnel generator component 450 preferably includes a plurality of components to allow for different stages of operation. In this embodiment, three components are provided and include a Flight Plan Manager component 300, a Display Driver component 350, and a Render Manager component 400 as shown in FIGS. 14 and 15. These components operate in a pipeline fashion with each component processing data generated from the previous stage and generating data for the next stage. However, it should be noted that these components can operate in parallel, and do not need to be synchronized.

In one embodiment, as shown in FIG. 14, the tunnel generator component 450 includes a computing component 452 and a graphics rendering component 454. The computing component 452 includes a processor component 456 for receiving navigation and display inputs, as described herein and processing the inputs to determine a tunnel definition (e.g., the shape of the tunnel for display). Such information may include flight plan navigation data 458, waypoint navigation data 460, flight plan standard approach and missed approach data 462 and flight director standard approach and missed approach information 464. The processor component 456 includes a tunnel interface 466 for generating a tunnel flight plan computation for a flight director component 468, which includes determining non-tunnel aircraft state variables and flight director queues (e.g., air speed information, rate of climb information, etc.). This information is provided to an avionics process component 472 for processing to provide updated information (e.g., navigation information) to an avionics render component 480 that renders and updates the display using the Flight Plan Manager component 300, Display Driver component 350 and the Render Manager component 400. In particular, these components generate the predicted flight path symbology system 100 including, the PFG symbology set 12, which may be provided in the multi-layer graphics approach 300 as shown herein.

It should be noted that the Flight Plan Manager component 300, the Display Driver component 350 and the Render Manager component 400 may be provided in different portions of the tunnel generator component 450' as shown in FIG. 15. Specifically, and as shown therein, the Flight Plan Manager component 300 may be provided as part of the processor component 456, the Display Driver component may be provided as part of the avionics process component 472 and the Render Manager component 400 may be provided as part of the avionics render component 480. However, these component parts may be modified and provided in different sections of the tunnel generator component 450 as desired or needed.

Specifically, the Flight Plan Manager component 300 provides for interpreting the current ownship (i.e., current aircraft) state information, the desired flight plan (e.g., whether the flight plan is from a predefined path, or generated "on the fly" during core mode operation), certain display parameters and generating a flight path fragment (e.g., a mathematical fragment). This fragment represents the shape of the desired flight path for the current visual frame. The mathematical description is a collection of points in space that each define a local shape and contain information on how to connect to the previous and next points. The description is parameterized based on time. Under certain conditions, the description separated into a horizontal description and a vertical description that have the same time basis.

The Flight Plan Manager component 300 also provides for calculating tunnel relative ownship state information for airframe consumption. This information includes, but is not limited to, shortest horizontal distance from the tunnel to the ownship (i.e., Horizontal Error), the vertical distance from the tunnel to the ownship (i.e., Altitude Error), the location in space exactly on the tunnel that is the closest to the ownship, the local shape of the tunnel at the ownship closest point, and other such information.

The Display Driver component 350 receives the flight path fragment from the Flight Plan Manager component 300 and generates a description of the fragment for rendering on a display. The path description represents a 2D line that travels through 3D space. The Display Driver component 350 uses this data to generate a 3D tunnel that has volume and bounds. The 3D tunnel representation generated is preferably a tunnel as described herein that pitches and rolls (i.e., twists) such that if the ownship is in the exact center of the tunnel and has the desired attitude, the top and bottom of the tunnel are parallel to the ownship wings. It should be noted that if the Flight Plan Manager component 300 generates separate horizontal and vertical flight plans, the Display Driver component 350 combines the two to generate a single, unified 3D tunnel representation. The output from the Display Driver component 350 is a collection of line segments that are the 3D tunnel bounds, and whose line segment type attributes (e.g., line length, line separation, etc.) are user controlled.

The Render Manager component 400 receives the 3D graphics representation of the current flight path fragment from the Display Driver component 350, the current ownship state, and renders the tunnel from the pilot's perspective. A 2D EADI, or parts thereof, in the background behind the tunnel may be rendered as shown, for example, in FIG. 3. It should be noted that the Render Manager component 400 may provide a 2D system graphics representation, with the 3D objects (e.g., the tunnel) converted within the Render Manager component 400 to a 2D representation. This allows the 3D perspective tunnel to be rendered on graphics systems that only support 2D graphics.

More preferably, and with respect to the component parts of the tunnel generator component 450, the Flight Plan Manager component 300 provides the computations needed to generate the flight path fragment that represents the tunnel for the current visual frame. These per-frame flight path fragments are essentially snap shot mathematical representations of the desired flight path. The desired flight path is provided preferably from either one of two predefined flight plans (e.g., a standard flight plan and a go-around flight plan), or from a flight plan fragment generated in real-time when one or more of the core modes is engaged. The Flight Plan Manager component 300 also computes feedback parameters. These parameters are computed based on where the aircraft should be compared to where it actually is. The desired position is assumed to be the closest point on the path to the current aircraft position. The information provided includes, but is not limited to horizontal error, vertical error, desired airspeed, desired position, desired orientation (i.e., roll, pitch, yaw), and local flight path shape.

The Flight Plan Manager component 300 may use one of two predefined flight plans as the current desired path. A flight plan is a sequenced collection of waypoints. The Flight Plan Manager component 300 generates a flight plan with three-dimensional segments that connect the waypoints in a manner that is appropriate for the airframe. Turns at the waypoints are managed by roll-in, constant-bank, and roll-out segments. Straight segments are used to connect the end of the rollout segment of the previous waypoint with the beginning of the roll-in segment of the next waypoint with altitude changes provided by the fifth degree polynomial blending curves. It should be noted that the total distance along the flight plan is computed as well as the estimated flight time.

A waypoint provides a location in space used to represent a position along a flight plan or plans. Three or more waypoints connected together in sequence define a flight plan. A waypoint captures the essence of the desired airframe state at the moment the aircraft passes through, or in most cases, nearby, the waypoint location. The information provided by a waypoint to the flight plan is the geodetic location of the waypoint, the desired indicated airspeed, turn rate, roll rate, and pitch rate of the ownship at the waypoint. The width and height of the visual tunnel at the waypoint is also included. Although each waypoint is independent of any other waypoint that may be in the flight plan, consideration is given to the airframe state information provided by each waypoint with respect to the previous and next waypoints to ensure that the flight plan makes sense. For example, if waypoint 'A' has an indicated airspeed of 200 knots and waypoint 'C' has an indicated airspeed of 250 knots, assigning waypoint 'B' an airspeed of 100 knots is not consistent. The rate information at waypoints (e.g., roll rate, turn rate, and pitch rate) is also considered with respect to the previous and next waypoints. For example, if the flight time from waypoint 'A', through waypoint 'B', to waypoint 'C' is one minute, and the turn at waypoint 'B' is 60 degrees, the turn rate at waypoint 'B' must be faster than one degree per second or it will take longer to complete the turn at 'B' than it would to travel from 'A' to 'C'. It should be noted that this type of inconsistent data provided to the flight plan from the waypoints will create unsolvable flight plans that will be rejected by the Flight Plan Manager component 300.

The Flight Plan Manager component 300 also provides guidance to the aircraft by computing a mathematical description of the four-dimensional (including time element) tunnel that represents the current desired path of the ownship. As described herein, the desired path can be one of two predefined flight plans provided to the Flight Plan Manager component 300 before operation, or from flight plan fragments generated in real-time that represent one or more engaged core modes. Core modes that may be provided, include, for example, altitude hold and heading hold. If either or both of these core modes are active, the predefined flight plans are ignored and the Flight Plan Manager component 300 uses core mode flight plan fragments that are generated in real-time.

In one exemplary embodiment, these core mode "miniature" flight plans are typically, at most, only three or four waypoints long and constantly move. If altitude hold core mode is the only core mode engaged, a moving three waypoint flight plan is generated on a per computational frame basis that is centered about the longitudinal and lateral CG of the airframe, pointing in the current heading of the ownship, and at the desired hold altitude. If the ownship drifts laterally, or the heading of the ownship changes, the tunnel reflects these changes instantly so that the ownship is always flying along the horizontal center of the tunnel. The three waypoints that are generated are set-up to be one behind the aircraft and two in front. As the aircraft moves through space, the waypoints move synchronously so that the waypoint immediately in front of the aircraft is brought closer and closer to the aircraft. This is provided to generate the visual effect of flying through a fixed tunnel. When the distance between the aircraft and the waypoint immediately in front of the aircraft becomes zero, the waypoint behind the aircraft is dropped, the approaching waypoint becomes the waypoint behind, the farthest out waypoint becomes the next immediate waypoint and a new farthest out waypoint is generated.

Further, in this embodiment, if heading hold core mode is the only code mode engaged, a moving three waypoint flight plan is generated on a per computational frame basis that is centered around the CG of the airframe, including altitude. The heading of this tunnel is set to be the desired hold heading. No matter where the airframe goes in space, the tunnel is always present, centered on the CG, and pointing in the heading hold direction. The three waypoints are managed in a similar fashion to the altitude hold core mode to create the visual image of moving through a fixed tunnel even though the tunnel constantly moves. When both of the core modes are engaged, the Flight Plan Manager component 300 combines the appropriate portions of the two flight plan fragments from the altitude hold mode and the heading hold mode and creates a single flight plan fragment. The Flight Plan Manager component 300 uses the heading hold core mode flight plan fragment as the basis of the combined core mode fragment and switches the altitude profile for the one from the altitude hold core mode. Thus, the combined core mode tunnel always points in the direction of the desired hold heading and is at the desired hold altitude.

In one embodiment, there are two types of core mode switching. The first is switching a core mode on or off and the second is changing the hold value of a core mode. The act of engaging and disengaging a core mode is provided by turning a flag on or off. In operation, if one or more of the core modes are engaged, the predefined flight plan is replaced with the appropriate core mode flight plan segment. The visual effect on the display is that the predefined flight plan tunnel is replaced with the core mode flight plan segment tunnel. When all core modes are disengaged, the core mode tunnel will immediately disappear and is replaced with the predefined flight plan tunnel. No smoothing or blending is attempted between the core mode tunnels and the predefined flight plan tunnels. When a core mode is first engaged, the tunnel will appear with the desired hold parameter location. As an example, if the aircraft is currently flying a predefined flight plan tunnel, and is at 5000 ft MSL when the altitude hold core mode is engaged with an altitude hold value at 7000 ft MSL, the predefined flight plan tunnel will disappear and is replaced with an altitude hold tunnel at 7000 ft MSL. If the aircraft then proceeds down this tunnel, for example, at a heading of 090 when the heading hold core mode is engaged with a heading value of 120, the tunnel will instantly point 30 degrees to the right of the ownship nose.

Once a core mode is engaged, switching the value of the core mode hold parameter, via flight director panel selection, generates a blended tunnel display with guidance to the newly selected state.

All flight plans, whether they are one of the two predefined flight plans, or a core mode flight plan fragment, are determined before used by the Flight Plan Manager component 300. Flight plan solving includes connecting the waypoints in a flight plan with flight plan segments that have second order continuity at the connection points. The flight plan is solved in two roughly independent profiles: a horizontal profile and a vertical profile. The horizontal profile makes use of four segment types (i.e., straight, roll-in, constant-back, and roll-out) and the vertical profile makes use of a fifth degree polynomial blending curve to connect the constant rate climb/descent portions of the flight plan.

Specifically, flight plan solving in the horizontal plane includes breaking down the approach to and departure from each waypoint into four connected segments. These segments are a straight approach segment, a roll-in segment that has a constant rate of bank change, a constant-bank turn segment, and a rollout segment that is the exact opposite of the roll-in segment. The end of each segment is connected to the beginning of the next segment with second order continuity. This results in waypoints that connect at the same point in space (i.e., zero order), that have the same tangent at this point (i.e., first order) and the rate of change of the tangent at this point is the same (i.e., second order). The first part of the horizontal flight plan solving determines the amount of heading change that is going to occur at the waypoint. This is provided by comparing the straight-line approach from the previous waypoint to the straight-line departure to the next waypoint. The difference in heading between these two radials is the heading change at the waypoint. Preferably, if the heading change at the waypoint is less than one degree, then only a straight approach segment is generated for the waypoint and the solver moves on to the next waypoint in the flight plan. If the amount of heading change at the waypoint is one degree or more, then the parameters that define all four segments are determined.

After a determination is made that all four segments are required, the rate information provided by the waypoint (i.e., roll rate, turn rate, airspeed) is used to compute the roll-in segment. The airspeed and turn rate at the waypoint determine the bank angle at the turn. The bank angle and the roll rate determine how long it will take to roll-in to the turn. Using this information, along with the total amount of heading change required and what the airspeed profile is from the previous waypoint to the current waypoint, a determination is made as to where the roll-in segment needs to begin on the approach to the waypoint. The entry and exit points for the roll-in segment are now known. The rollout segment is the opposite of the roll-in segment. The constant-bank turn segment is provided between the roll-in and roll-out segments, so the turn segment is known, and the approach segment starts at the end of the roll-out segment of the previous waypoint and goes to the start of the roll-in segment for this waypoint, so the approach segment is known.

Once the beginning and ending points of the segments have been determined, rejection tests are preferably performed on the segments. The rejection tests are performed on the approach and turn segments, as their starting and ending points are taken from the computed roll-in and rollout segments. The rejection test consists of checking to see whether or not the end of the segment starts before the beginning of the segment. If the rejection test rejects the approach segment, this indicates that it took too long to roll into the required bank angle for the turn segment. Basically, the airframe would have had to start rolling in for the turn before it had finished rolling out from the previous turn. This condition is resolved by increasing the roll rate, and/or increasing the turn rate. Increasing the turn rate decreases the turn radius at the waypoint allowing for a later start to the roll-in segment, but it increases the bank angle in the turn, thus lengthening the amount of time required for the roll-in. These two parameters are modified together to get an accepted turn. If the rejection test rejects the turn segment, this indicates that by the time the airframe has rolled into the bank angle specified for the turn (i.e., waypoint airspeed and turn rate determine the specified bank angle), the airframe has already turned more than the heading change required by the waypoint/flight plan geometry. Reducing the required bank angle and roll-in rate can resolve this condition. By reducing these two parameters, the amount of time and aggressiveness of the roll-in are reduced, thus decreasing the amount of heading change occurring in the roll-in segment.

It should be noted that the rate parameters at the waypoints must also be considered. Further, the waypoint rate parameters are adjusted within certain limits when a rejection test rejects a segment. This is provided to resolve the waypoint turn successfully. If a combination of rate parameters that is acceptable cannot be determined, the turn segments (i.e., roll-in, constant-bank turn, and roll-out) are removed and are an instantaneous turn at the waypoint in the flight plan is provided.

The vertical profile of the flight plan is preferably solved independently of the horizontal flight plan. After the horizontal profile has been solved, the range to the end of the flight plan is calculated for each flight plan segment that was generated. This range is used as the independent variable for the altitude solution (i.e. altitude=f(range), where f( ) is a fifth degree polynomial). At each waypoint where there is a change in altitude rate, the fifth degree polynomial that blends the two altitude segments with second order continuity is calculated.

In operation, the Display Driver component 350 converts the mathematical flight path fragment into data structures used to draw a perspective guidance tunnel that represents the flight path. The Display Driver component 350 is preferably the second component in the three-stage pipeline of the tunnel generator component 450. The input to the component is generated by the previous stage, i.e., the Flight Plan Manager component 300. The output of the Display Driver component 350 is the then preferably the input to the third and last stage of the pipeline, i.e., the Render Manager component 400.

The Display Driver component 350 converts the mathematical description of the current flight path fragment into data structures used to draw the perspective tunnel. The Flight Plan Manager component 300 and the Display Driver component 350 are preferably provided on different CPU resources. In such a configuration, communication of the proper data across the computing systems is required and may be provided in any known manner.

Specifically, the mathematical flight path fragment that is generated by the Flight Plan Manager 300 is a collection of flight path segments that represent the visual part of the tunnel for the current simulation frame. The Display Driver component 350 samples the flight path at regular distance intervals and builds a tunnel segment at each of these samples. A tunnel segment consists of the four lines that are drawn at the four corners of the tunnel bounds. These lines start at the tunnel corners and point in the tangent direction of the flight path at the tunnel segment location. The flight path sampling starts at the point on the flight path that is the closest to the current aircraft position and continues along the flight path until the samples are no longer in the current visual frame. From frame to frame the tunnel segments appear as if they are fixed in space relative to the ground. This is provided to achieve a "fly-through" effect.

The two display parameters used by the Display Driver component 350 that are related to the tunnel segments are the tunnel segment length and the tunnel segment spacing. The tunnel segment length is the length, in feet, of the tunnel segment lines. The tunnel segment spacing is the distance the start of the tunnel segment lines are from each other. As an example, if the tunnel segment lines are set to 607 feet, and the tunnel segment spacing is set to 6076 feet, then the start of each tunnel segment line would be one nautical mile apart, with the length of the lines being one tenth of a nautical mile. Thus, the output data from the Display Driver component 350 provided to the Render Manager component 400 is a collection of tunnel segments.

The Render Manager component 400 is preferably the final stage in the tunnel generator component 450. The Render Manager component 400 generates the visual output (i.e., the 3D tunnel). The Render Manager component 400 provides (e.g., draws) the EADI background elements and the 3D perspective tunnel representation of the flight path. The appearance of the EADI is determined by values provided within the Render Manager component 400, whereas the tunnel shape and location are determined from the output of the previous stages.

The Render Manager component 400 uses a known OpenGL rendering system to provide the final output. The Tunnel Render Manager component 400 is configured to operate as a callback in an already defined and set-up two-dimensional environment. The Render Manager component 400 assumes that the viewport has been set-up and that an orthographic projection has been set-up that is the physical size of the display. The primary 3D component generated is the tunnel representation. A user preferably has control over tunnel color, line segment length, line segment spacing and other graphics attributes.

The Render Manager component 400 essentially draws a two-dimensional symbology set that include elements taken from a standard EADI. These elements include, but are not limited to, a horizon line, water-line symbol, pitch ladder, radial lines, heading tape, heading bug, radar altitude display, two-tone sky-ground, flight path vector symbol, power cue, pitch cue, and longitudinal acceleration caret. These symbols preferably can individually be turned on and off.

The primary data input to the Render Manager component 400 is the output of the Display Driver component 350. In operation, after the Display Driver component 350 has completed a frame, data from the Render Manager component 400 is obtained and provides graphics rendered on the display device (e.g., cockpit display).

It should be noted that the calculations and determinations performed by the Flight Plan Manager component 300, the Display Driver component 350 and the Render Manager component 400 are not limited to the calculations and determinations as described herein, but may be implemented and performed in any known manner and/or as required by particular system requirements.

Thus, the dGPS receiver 202 receives aircraft position information (e.g., specific location information including longitude and latitude) which is used in combination with terrain digital map and terrain elevation data stored within the database 204 to generate a guidance profile. In particular, based upon the received aircraft position information, terrain digital map and terrain elevation data for that position is obtained from the database 204, which may include information regarding the height of the terrain and other ground features, navigational obstacles and navigational aids. This information for the specific position may be defined, for example, by terrain waypoints within the database 204 with aircraft position determined by waypoint geolocation using, for example, dGPS. This information is then used by the tunnel generator component 450 to update the display 208 including the predictive flight path symbology system 100 and the PFG symbology set 12 based upon the guidance profile defining the determined parameters for the display (e.g., tunnel profile). Further, feedback information from the flight director system 250 is also used to generate guidance profile, which feedback may result for example from a user input change (e.g., change in TCL).

In operation, using the predictive flight path symbology system 100 controlled by various embodiments of the control system 200, flight director system 250, and tunnel generator component 450 of the present invention, and for example, a V-22 operational TF/TA flight plan may be flown with terrain following operation having a simplified display symbology set (i.e., PFG symbology set 12). Different modes of operation (i.e. flight plan mode and core mode) are also provided. It should be noted that modifications to the predictive flight path symbology system 100 may be provided, including modification to the symbology and displays as needed or desired. For example, a selectable field of view (FOV) option for optimization of the tunnel display for different flight-directed modes may be provided. In particular, based on the constraints on tunnel size, aircraft speed, and command-frame look-ahead time to perform the TF/TA task, the FOV may be reduced from the nominal 75 degree view used to a 20 degree view in order to achieve an acceptable (e.g., larger) tunnel size on the display. This results in a magnification of the information within that region on the display 208.

Further, an FPV-centered display option may be provided to allow for centering of the display about the FPV, or alternatively about the waterline symbol. For example, during flight at extreme attitudes (e.g., steep approaches or slow speeds), centering of the display about the FPV brings the primary information back to the center of the display.

Additionally, and for example, as shown in FIG. 7, two frames may be displayed outlining the tunnel. A first frame 23 is a reference frame, which may be color coded (e.g., teal), and is shown co-temporal with the aircraft current position (i.e., aircraft nose). When compared to the aircraft waterline symbol, this first frame 23 shows the relative position of the aircraft 156 to the tunnel. The second frame is the quickened command frame 22, which also may be color coded (e.g., magenta), and is shown at some designated time in front of the aircraft 156 based on the current airspeed. The faster the aircraft 156 is moving, the further ahead in the tunnel, and thus smaller the quickened command frame 22 appears. The QFPV symbol 18 is quickened to make it co-temporal with the first frame 23, thus making it a predictor of the future aircraft position. Therefore, if the aircraft 156 is flown with the QFPV symbol 18 inside of the quickened command frame 22 then the aircraft flight path will stay within the confines of the tunnel.

The brackets 34 are also included on the display to allow for reacquiring the tunnel when the quickened command frame 22 disappears from the display. As shown, the brackets 34 preferably appear on the periphery of the Attitude Director Indicator (ADI) to indicate the direction the pilot should steer the aircraft 156 to reacquire the tunnel (i.e. when a bracket 34 appears on the left edge of the ADI, the pilot should steer the aircraft to the left to reacquire the tunnel). If the pilot is turning away from the tunnel, the aircraft will eventually reach a reciprocal heading. When this occurs, the bracket 34 will switch sides, indicating that the pilot is now turning in the correct direction to reintercept. Thus, as described herein, the brackets 34 indicate left/right and above/below position relative to the pathway. A heading tape may be added to the artificial horizon line for additional situational awareness.

Other modifications to the various embodiments of the invention are contemplated. For example, a modified command frame and broken lines 16 to reinforce to the pilot the different flight phase may be provided. In this embodiment, the top of the quickened command frame 22 and upper broken lines 16 are removed to indicate no ceiling to the operation. Also, the broken lines 16 and the quickened command frame 22 are color coded (e.g., orange) in a color to differentiate front-side of the approach from the back-side missed approach. The same quickening time element is utilized for this embodiment.

Figure 8:
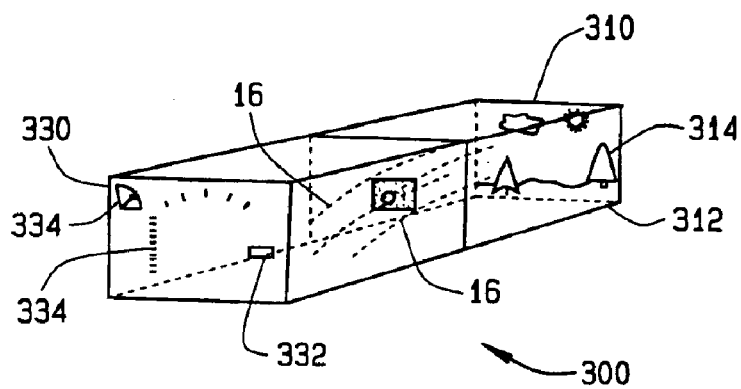
FIG. 8 is a block diagram of one embodiment of an exemplary multi-layered display according the present invention.

Further, embodiments of the present invention allow for displaying tunnel symbologies in combination with standard auxiliary symbologies and a synthetic vision type display (e.g., open flight database scene) using, for example, a multi-layered graphics approach 300 as shown generally in FIG. 8. In general, and shown therein, a first layer 310 is configured to provide a synthetic view, which may be a two-dimensional or three dimensional rendering of a view representative of terrain, including for example, obstacles such as mountains 312 and trees 314, over and around which an aircraft must maneuver. A second layer 320 overlays the first layer 310 and in a more preferred embodiment, provides graphics over the synthetic view. For example, the open tunnel bounded by broken tunnel lines 16, linear electronic attitude direction indicator (EADI), such as the quickened command reference frame 22 and related symbologies may be provided as part of this layer. A third layer 330 overlays the first and second layers 310, 320 and includes non-tunnel related symbology, such as, for example airspeed box 332, rate-of-climb indicators 334 and other similar symbology as needed or desired.

Figure 9:
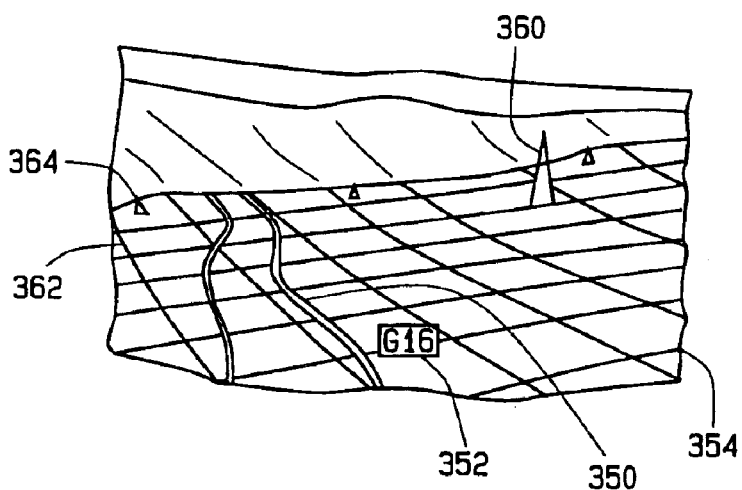
FIG. 9 is an exemplary display showing three-dimensional objects that may be provided in connection with various embodiments of a predictive flight path symbology system according to the present invention.
Figure 10:
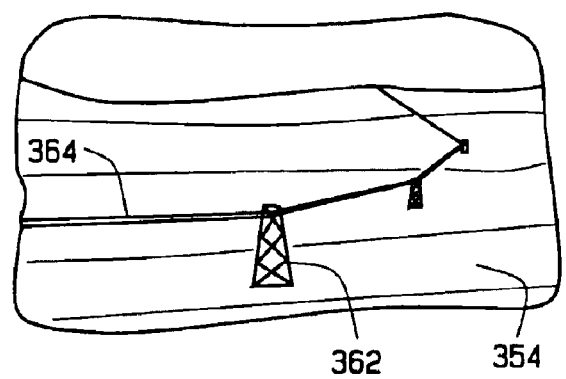
FIG. 10 is another exemplary display showing three-dimensional objects that may be provided in connection with various embodiments of a predictive flight path symbology system according to the present invention.

In various embodiments, using terrain data stored within the database 204, other ground features and/or a three-dimensional terrain may be provided as part of the first layer 310. For example, ground cues such as roads, railroads, rivers, lakes, fields, buildings navigational obstacles and navigational aids, among others may be provided. In particular, using terrain elevation data as described herein and feature source data (e.g., digital format imagery), three-dimensional images may be provided as part of a display displaying the predictive flight path symbology system 100. The images are preferably highlighted (e.g., color coded and/or marking designations) for easier identification. For example, as shown in FIG. 9, representations of highways 350 may be identified by color and a marking designation 352 (e.g., highway number) on the rendered terrain 354. As shown in FIGS. 9 and 10, and for further example, towers may be represented by tower shaped objects 360, with power line towers represented by solid tower-shaped objects 362 having solid lines 364 therebetween representing power lines. It should be noted that these are merely exemplary objects that may be provided on the display. For example, cities may be represented by colored areas on the rendered terrain 354 with the city name above it in three-dimensional lettering. Further, the level of detail of the displayed objects may be varied (e.g., more detailed rendering as aircraft approaches closer to the objects).

Thus, as shown in FIG. 11, a display 400 may be provided and configured having tunnel symbology, including the open tunnel bounded by broken tunnel lines 16 combined with and overlaying a three-dimensional synthetic view terrain 354, which includes three dimensional images and/or objects representing various objects on the terrain 354 (e.g., buildings 402 and a runway 404). The display 400 displaying the predictive flight path symbology system 100 in combination with a three-dimensional synthetic view terrain may be provided and configured as, for example, a six inch by six inch display field for use as part of a multi-function display (MFD) of a cockpit.

Thus, embodiments of the present invention may provide accurate elevation and obstacle data to aircraft flight director systems, such as the flight director system 250, to provide a pilot with immediate, real-time flight guidance information. Using highly accurate data from an accurate digital map system, which is updated and correlated with the aircraft dGPS position and inertial spatial data, terrain data is provided to pilots in a real-time, anticipatory and intuitive format. Embodiments of the present invention provide flight director guidance for critical maneuvers (e.g., maneuvers with very small margins of error) having precision navigation requirements. Information provided and displayed by embodiments of the present invention include future flight path information for use by a pilot. The displayed information, including the predictive information responds to changes in pilot control input. Further, an FPV-based predictive flight path symbology system of the present invention provides pilots with an intuitive symbology set that enables the execution of steep, precision, instrument approaches in near zero visibility. The use of dGPS provides precision waypoint geolocation, and a quickened predictive FPV symbol and "tunnel-in-the-sky" pathway guidance resulting in an intuitive instrument approach guidance display system for use in, for example, rotorcraft/tiltrotor applications. Thus, embodiments of the present invention improve performance and reduce pilot workload using various guidance and display options for terminal flight operations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An aircraft guidance system comprising:
    a flight guidance component configured to determine a current aircraft state;
    a control component configured to receive information relating to the current aircraft state and comparing to a desired aircraft state; and
    a tunnel generator component configured to receive navigation control inputs and determine a tunnel profile defining a virtual tunnel having a predetermined predictive time frame for display to control guidance of an aircraft and based upon the compared current aircraft state and desired aircraft state.

2. The aircraft guidance system according to claim 1 further comprising one or more navigation sensors to determine the current aircraft state and wherein the control component determines guidance errors based upon received current aircraft state information from the one or more navigation sensors and the desired aircraft state.

3. The aircraft guidance system according to claim 2, wherein the desired aircraft state is further based upon the navigation control inputs received by the tunnel generator component.

4. The aircraft guidance system according to claim 1, wherein the desired aircraft state comprises a required aircraft state.

5. The aircraft guidance system according to claim 1, wherein the flight guidance component is configured to determine user inputs changing the current aircraft state.

6. The aircraft guidance system according to claim 1, wherein the tunnel generator component is configured to determine a flight plan based upon the received navigation control inputs and to define the virtual tunnel based upon the flight plan.

7. The aircraft guidance system according to claim 1, wherein the received navigation control inputs comprise guidance and display information.

8. The aircraft guidance system according to claim 7, wherein the guidance information comprises waypoint information.

9. The aircraft guidance system according to claim 8, wherein the control component comprises a database having terrain information for use with the waypoint information to define the virtual tunnel in combination with a terrain following guidance profile.

10. The aircraft guidance system according to claim 1, wherein the virtual tunnel is configured to provide a perspective flight guidance display comprising a three-dimensional tunnel.

11. The aircraft guidance system according to claim 10, wherein the perspective flight guidance display comprises predictive navigation information.

12. The aircraft guidance system according to claim 10, wherein a shape of the three-dimensional tunnel changes to represent a predictive positional and attitude state of an aircraft.

13. The aircraft guidance system according to claim 1, wherein feedback information from the control component is used to control pitch and power cues.

14. The aircraft guidance system according to claim 13, wherein the pitch and power cues are configured for display as virtual triangles at the ends of a flight path vector symbol and generated based upon error signals determined from the difference between current aircraft state feedback information and tunnel guidance information from the tunnel generator component.

15. The aircraft guidance system according to claim 1, wherein one of the tunnel generator component or control component determines vertical and lateral quickening values to synchronize the motion of a flight path vector symbol with a tunnel command frame provided in connection with the virtual tunnel.

16. The aircraft guidance system according to claim 15, wherein the lateral quickening value is determined based upon an approximation of future cross track deviation.

17. The aircraft guidance system according to claim 1, wherein the tunnel generator component is configured to receive navigation control inputs in one of:
 a flight plan mode adapted to receive a flight plan input; and
 a core mode adapted to receive a hold input.

18. The aircraft guidance system according to claim 17, wherein the flight plan input comprises a plurality of waypoints.

19. The aircraft guidance system according to claim 17, wherein the hold input comprises at least one of heading hold information and altitude hold information.

20. The aircraft guidance system according to claim 19, wherein the tunnel generator generates a flight path based upon the hold input.

21. The aircraft guidance system according to claim 1, wherein the tunnel generator component comprises:
 a flight plan component configured to generate a flight plan representing a shape of a current desired flight path based upon stored navigation information;
 a display component configured to receive the generated flight plan and to generate a three-dimensional graphical representation of the generated flight plan; and
 a rendering component configured to receive the three-dimensional graphical representation and to generate a predictive three-dimensional virtual tunnel for display.

22. The aircraft guidance system according to claim 21, wherein the flight plan component is configured to receive current aircraft state information and desired flight plan information to generate the flight plan.

23. The aircraft guidance system according to claim 22, wherein the flight plan comprises horizontal and vertical flight information.

24. The aircraft guidance system according to claim 21, wherein the display component is further configured to generate a three-dimensional graphical representation that changes shape based upon the shape of the current desired flight plan.

25. The aircraft guidance system according to claim 21, wherein the three-dimensional graphical representation comprises a plurality of line segments defining the bounds of a three-dimensional virtual tunnel.

26. The aircraft guidance system according to claim 21, wherein the rendering component is configured to generate two-dimensional navigation members in combination with the predictive three-dimensional virtual tunnel for display.

27. The aircraft guidance system according to claim 21, wherein the rendering component is configured to generate the predictive three-dimensional virtual tunnel in combination with terrain information.

28. The aircraft guidance system according to claim 27, wherein the terrain information comprises three-dimensional terrain view information.

29. An aircraft guidance system comprising:
 means for determining a current aircraft state;
 means for receiving information relating to the current aircraft state and comparing to a desired aircraft state based upon stored navigation data; and
 means for receiving navigation control inputs and determining a tunnel profile defining a virtual tunnel having a predetermined predictive time frame for display to control guidance of an aircraft based upon the compared current aircraft state and the desired aircraft state.

30. The aircraft guidance system according to claim 29 further comprising means for providing feedback information for use in determining the tunnel profile.

31. The aircraft guidance system according to claim 30, wherein the feedback information comprises aircraft state information and further comprising means for determining an error value based upon the feedback information.

32. The aircraft guidance system according to claim 31, further comprising means for generating pitch and power cues for display based upon the error value.

33. The aircraft guidance system according to claim 30 further comprising means for generating a three-dimensional tunnel for display based in part upon the feedback information.

34. A method for providing aircraft guidance comprising:
 determining a current aircraft state;
 comparing the determined current aircraft state to a desired aircraft state; and
 generating a predictive three-dimensional virtual tunnel having a predetermined predictive time frame for display based upon the comparison between the current aircraft state and the desired aircraft state, and based upon stored navigation information.

* * * * *